United States Patent
Krishnan et al.

(10) Patent No.: US 12,393,514 B2
(45) Date of Patent: Aug. 19, 2025

(54) PRE-OPTIMIZER AND OPTIMIZER BASED FRAMEWORK FOR OPTIMAL DEPLOYMENT OF EMBEDDING TABLES ACROSS HETEROGENEOUS MEMORY ARCHITECTURE

(71) Applicant: Tata Consultancy Services Limited, Mumbai (IN)

(72) Inventors: Ashwin Krishnan, Thane (IN); Manoj Karunakaran Nambiar, Thane (IN); Rekha Singhal, Thane (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 18/804,270

(22) Filed: Aug. 14, 2024

(65) Prior Publication Data
US 2025/0086111 A1    Mar. 13, 2025

(30) Foreign Application Priority Data
Sep. 8, 2023  (IN) .............................. 202321060567

(51) Int. Cl.
*G06F 12/08* (2016.01)
*G06F 12/0802* (2016.01)

(52) U.S. Cl.
CPC .............................. *G06F 12/0802* (2013.01)

(58) Field of Classification Search
CPC ................................................ G06F 12/0802
USPC ............................................................ 711/129
See application file for complete search history.

(56) References Cited

U.S. PATENT DOCUMENTS

2018/0150489 A1* 5/2018 Yamazaki ............... G06F 3/067

FOREIGN PATENT DOCUMENTS

CN    202221057974.XU    8/2022

OTHER PUBLICATIONS

Author: Daniar H. Kurniawan, Ruipu Wang, Kahfi S. Zulkifli [et. al] Title: EVStore: Storage and Caching Capabilities for Scaling Embedding Tables in Deep Recommendation Systems Title of the item: ASPLOS '23 Date: 2023 Publisher: ACM.
Author: Samuel Hsia, Udit Gupta, Bilge Acun [et. al] Title: MP-Rec: Hardware-Software Co-Design to Enable Multi-Path Recommendation Date: 2023 Link: https://arxiv.org/pdf/2302.10872.

* cited by examiner

*Primary Examiner* — Jae U Yu
(74) *Attorney, Agent, or Firm* — Finnegan, Henderson, Farabow, Garrett & Dunner, LLP

(57) ABSTRACT

High-performance deployment of DNN recommendation models heavily rely on embedding tables, and their performance bottleneck lies in the latency of embedding access. To optimize the deployment of RMs, the method and system is disclosed, which leverages heterogeneous memory types on FPGAs to improve the overall performance by maximizing the availability of frequently accessed data in faster memory. The system, using a optimizer dynamically allocates table partitions of the embedding tables based on history of input access history. A pre-optimizer block disclosed determines whether smaller tables should be partitioned or placed entirely in smaller memories, improving overall efficiency. The performance of RM is improved with improvement in average embedding fetch latency and effectively inference latency via modified Round Trip computation.

18 Claims, 5 Drawing Sheets

300

302 — receiving by a pre-optimizer a plurality of input parameters comprising (i) a memory configuration of a heterogeneous memory architecture used by a RM during inference, the heterogenous memory architecture comprising a first level memory and a second level memory of a FPGA accelerator, and a CPU memory type, (ii) an access latency of each memory type of the heterogeneous memory architecture, (iii) a total number of a plurality of embedding tables in the RM, (iv) a plurality of embeddings in each of the plurality of embedding tables, (v) an input access pattern obtained from the CDF, and (vi) a table access pattern of each table from the plurality of embedding tables depicting number of access required from each table per inference

304 — identifying a RM type, by the one or more hardware processors, based on the total number of the plurality of embedding tables, wherein the RM type is one of a small model, a medium model, and a large model

306 — determining an optimal deployment of the plurality of embedding tables on the first level memory and the second level memory in accordance with the RM type using one or more of a pre-optimizer for determining initial table partitions within the plurality of embedding tables, an optimizer to determine final table partitions within the plurality of embedding tables by optimizing the initial partitions, and Round Trips (RTs) to the second level memory

308 — sorting the final table partitions generated by one of pre-optimizer and optimizer based on keys associated with the final table partitions to run the learned index technique to be processed by RM during inference

310 — dynamically mapping each table partition in accordance with the final table partitions to one of the first level memory and the second level memory by a heterogenous mapper on receiving a shuffle signal triggered due to change in the input access pattern

FIG. 3

PRE-OPTIMIZER AND OPTIMIZER BASED FRAMEWORK FOR OPTIMAL DEPLOYMENT OF EMBEDDING TABLES ACROSS HETEROGENEOUS MEMORY ARCHITECTURE

PRIORITY CLAIM

This U.S. patent application claims priority under 35 U.S.C. § 119 to: Indian Application No. 202321060567, filed on Sep. 8, 2023. The entire contents of the aforementioned application are incorporated herein by reference.

TECHNICAL FIELD

The embodiments herein generally relate to the field of Recommendation Models (RMs) and, more particularly, to a method and system for pre-optimizer and optimizer based framework for optimal deployment of embeddings tables across heterogeneous memory architecture for high-speed recommendation by the RMs.

BACKGROUND

Use of Deep Neural Network (DNN) based models for recommendations (e.g., products, videos, tweets, and posts) in enterprise applications has been increasing. In DNN based approach, any discrete entity such as each user, movie etc., is represented to a continuous space through embeddings, which are vector representations of an entity. Each item in the vector represents a feature or a combination of features for that entity. Recommendation Models (RMs) are known for their extensive use of embedding tables to evaluate the probability of a product being clicked. Embedding tables are composed of tens to billions of latent embedding vectors. Typically, a few tens to hundreds of embedding tables are present depending on the type of the model used with varying embedding dimensions.

Embedding access is the main performance bottleneck in RMs due to their large size and the randomness in the way they are looked up. Embedding access time largely depends on their access patterns that includes number of embedding lookups per table in a single recommendation that has large variations depending on the architecture of the recommendation model. The products or items scanned is limited by embedding tables. These embedding tables are large and randomly accessed, therefore slow due to the limited memory. By increasing the average speed of access from an embedding table, one could thereby increase quality and improve customer retention/conversion improving the bottom line of the business.

Existing deployments of recommendation models require huge amounts of memory and are restricted in recommendations scanned per second due to the Service Level Agreement (SLA). The state-of-the-art, focused on performance optimized deployment of RMs, but lacks explorations in heterogeneous memory architecture domain to leverage optimal partitioning and dynamic deployment by analyzing workload during inference. The current state-of-the-art considers static placement of the embedding tables, which may not be optimal since input access pattern changes with time during inference. Further, all embedding tables need to be accessed for an inference and the inference time is bounded by the slowest access.

One of the recent work of the applicant Hetero-Rec: Optimal Deployment of Embeddings for High-Speed Recommendations, also filed as India patent application No. 202221057974, on Oct. 10, 2022, addresses the challenges of optimal deployment of embeddings in heterogenous memory architecture comprising Block Random Access Memory (BRAM), Ultra Random Access Memory (URAM), URAM, High Bandwidth Memories (HBMs) High Bandwidth Memories (HBMs) Dual-Data Rate (DDR) of Field Programmable Gate Arrays (FPGAs) to speed-up the inference CPU memory types. The above Hetero-Rec work was developed with understanding of the limited dataset of the embedding tables available then. It was developed on the basis of earlier available datasets sets, with limited number of embedding tables. However, the latest studies shows that the embedding tables may not always be skewed, and the number of tables might be very large. This would cause a lot of cache misses and increase the overall latency. Thus, the Hetero-Rec fails to address the challenges of recent datasets. Thus, for achieving enhanced optimization it is critical to understand the nature of the embedding tables before applying any optimization that remains unaddressed in conventional approaches.

SUMMARY

Embodiments of the present disclosure present technological improvements as solutions to one or more of the above-mentioned technical problems recognized by the inventors in conventional systems.

For example, in one embodiment, a method for high speed recommendations is provided. The method includes receiving by a pre-optimizer a plurality of input parameters comprising (i) a memory configuration of a heterogeneous memory architecture used by a Recommendation Model (RM) during inference, the heterogenous memory architecture comprising a first level memory and a second level memory of a Field Programmable Gate Array (FPGA) accelerator, and a CPU memory type, (ii) an access latency of each memory type of the heterogeneous memory architecture, (iii) a total number of a plurality of embedding tables in the RM, (iv) a plurality of embeddings in each of the plurality of embedding tables, (an input access pattern of the plurality of embedding tables, and (vi) a table access pattern of each table from the plurality of embedding tables depicting number of access required from each table per inference.

Further, the method includes identifying a RM type based on the total number of the plurality of embedding tables, wherein the RM type is one of a small model, a medium model, and a large model. Further, the method includes determining an optimal deployment of the plurality of embedding tables on the first level memory and the second level memory in accordance with the RM type using one or more of a pre-optimizer for determining initial table partitions within the plurality of embedding tables, an optimizer to determine final table partitions within the plurality of embedding tables by optimizing the initial partitions, and Round Trips (RTs) to the second level memory.

If the identified RM type is the small model then determining the optimal deployment of the plurality of embedding tables comprises: running the pre-optimizer on the plurality of embedding tables for caching on the first level memory, wherein (a) the pre-optimizer determines whether to partition the plurality of embedding tables by analyzing a set of pre-defined combination of table partitions satisfying a set of space constraints with a predetermined criteria defining that an overall hit rates of each embedding table should be at least 5%, and (b) if the plurality of embedding tables are to be partitioned the pre-optimizer determines the initial table partitions for the first level memory in accordance with predefined initial permissible combinations of table partitions. Thereafter, running the optimizer on the initial table partitions with a set of space constraints to optimize the initial table partitions for the first level memory and obtain the final table partitions for the first level memory for caching associated embeddings on a first type of the first level memory. Thereafter, calculating number of Round Trips (RT) to the second level memory for remaining table partitions other than the initial table partitions from among the plurality of embedding tables. Further, running, if the RT is greater than unity, the pre-optimizer to determine the initial table partitions for the remaining table partitions followed by the optimizer for generating the final table partitions for the remaining table partitions for caching on the second level memory; and pushing, if the RT is less than or equal to unity, the remaining table partitions as final table partitions onto the second level memory, in accordance with a memory constraint that not more than one embedding table is allocated to an individual bank among a plurality of banks of the second level memory, wherein the final table partitions for each of the plurality of embedding tables are indexed using learned index technique.

Furthermore, the method includes sorting the final table partitions generated by one of pre-optimizer and optimizer based on keys associated with the final table partitions to run the learned index technique to be processed by RM during inference.

Further the method includes dynamically mapping each table partition in accordance with the final table partitions to one of the first level memory and the second level memory by a heterogenous mapper executed by the one or more hardware processors on receiving a shuffle signal triggered due to change in the input access pattern.

In another aspect, a system for high speed recommendations is provided. The system comprises a memory storing instructions; one or more Input/Output (I/O) interfaces; and one or more hardware processors coupled to the memory via the one or more I/O interfaces, wherein the one or more hardware processors are configured by the instructions to receive by a pre-optimizer a plurality of input parameters comprising (i) a memory configuration of a heterogeneous memory architecture used by a Recommendation Model (RM) during inference, the heterogenous memory architecture comprising a first level memory and a second level memory of a Field Programmable Gate Array (FPGA) accelerator, and a CPU memory type, (ii) an access latency of each memory type of the heterogeneous memory architecture, (iii) a total number of a plurality of embedding tables in the RM, (iv) a plurality of embeddings in each of the plurality of embedding tables, (v) an input access pattern of the plurality of embedding tables, and (vi) a table access pattern of each table from the plurality of embedding tables depicting number of access required from each table per inference.

Further, the one or more hardware processors are configured by the instructions to identify a RM type based on the total number of the plurality of embedding tables, wherein the RM type is one of a small model, a medium model, and a large model. Further, the method includes determining an optimal deployment of the plurality of embedding tables on the first level memory and the second level memory in accordance with the RM type using one or more of a pre-optimizer for determining initial table partitions within the plurality of embedding tables, an optimizer to determine final table partitions within the plurality of embedding tables by optimizing the initial partitions, and Round Trips (RTs) to the second level memory.

If the identified RM type is the small model then determining the optimal deployment of the plurality of embedding tables comprises: running the pre-optimizer on the plurality of embedding tables for caching on the first level memory, wherein (a) the pre-optimizer determines whether to partition the plurality of embedding tables by analyzing a set of pre-defined combination of table partitions satisfying a set of space constraints with a predetermined criteria defining that an overall hit rates of each embedding table should be at least 5%, and (b) if the plurality of embedding tables are to be partitioned the pre-optimizer determines the initial table partitions for the first level memory in accordance with predefined initial permissible combinations of table partitions. Thereafter, running the optimizer on the initial table partitions with a set of space constraints to optimize the initial table partitions for the first level memory and obtain the final table partitions for the first level memory for caching associated embeddings on a first type of the first level memory. Thereafter, calculating number of Round Trips (RT) to the second level memory for remaining table partitions other than the initial table partitions from among the plurality of embedding tables. Further, running, if the RT is greater than unity, the pre-optimizer to determine the initial table partitions for the remaining table partitions followed by the optimizer for generating the final table partitions for the remaining table partitions for caching on the second level memory; and pushing, if the RT is less than or equal to unity, the remaining table partitions as final table partitions onto the second level memory, in accordance with a memory constraint that not more than one embedding table is allocated to an individual bank among a plurality of banks of the second level memory, wherein the final table partitions for each of the plurality of embedding tables are indexed using learned index technique.

Furthermore, one or more hardware processors are configured by the instructions to sort the final table partitions generated by one of pre-optimizer and optimizer based on keys associated with the final table partitions to run the learned index technique to be processed by RM during inference.

Further, one or more hardware processors are configured by the instructions to dynamically map each table partition in accordance with the final table partitions to one of the first level memory and the second level memory by a heterogenous mapper executed by the one or more hardware processors on receiving a shuffle signal triggered due to change in the input access pattern.

In yet another aspect, there are provided one or more non-transitory machine-readable information storage mediums comprising one or more instructions, which when executed by one or more hardware processors causes a method for high speed recommendations. The method includes receiving by a pre-optimizer a plurality of input parameters comprising (i) a memory configuration of a heterogeneous memory architecture used by a Recommendation Model (RM) during inference, the heterogenous memory architecture comprising a first level memory and a second level memory of a Field Programmable Gate Array (FPGA) accelerator, and a CPU memory type, (ii) an access latency of each memory type of the heterogeneous memory architecture, (iii) a total number of a plurality of embedding tables in the RM, (iv) a plurality of embeddings in each of the plurality of embedding tables, (v) an input access pattern of the plurality of embedding tables, and (vi) a table access pattern of each table from the plurality of embedding tables depicting number of access required from each table per inference.

Further, the method includes identifying a RM type based on the total number of the plurality of embedding tables, wherein the RM type is one of a small model, a medium model, and a large model. Further, the method includes determining an optimal deployment of the plurality of embedding tables on the first level memory and the second level memory in accordance with the RM type using one or more of a pre-optimizer for determining initial table partitions within the plurality of embedding tables, an optimizer to determine final table partitions within the plurality of embedding tables by optimizing the initial partitions, and Round Trips (RTs) to the second level memory.

If the identified RM type is the small model then determining the optimal deployment of the plurality of embedding tables comprises: running the pre-optimizer on the plurality of embedding tables for caching on the first level memory, wherein (a) the pre-optimizer determines whether to partition the plurality of embedding tables by analyzing a set of pre-defined combination of table partitions satisfying a set of space constraints with a predetermined criteria defining that an overall hit rates of each embedding table should be at least 5%, and (b) if the plurality of embedding tables are to be partitioned the pre-optimizer determines the initial table partitions for the first level memory in accordance with predefined initial permissible combinations of table partitions. Thereafter, running the optimizer on the initial table partitions with a set of space constraints to optimize the initial table partitions for the first level memory and obtain the final table partitions for the first level memory for caching associated embeddings on a first type of the first level memory. Thereafter, calculating number of Round Trips (RT) to the second level memory for remaining table partitions other than the initial table partitions from among the plurality of embedding tables. Further, running, if the RT is greater than unity, the pre-optimizer to determine the initial table partitions for the remaining table partitions followed by the optimizer for generating the final table partitions for the remaining table partitions for caching on the second level memory; and pushing, if the RT is less than or equal to unity, the remaining table partitions as final table partitions onto the second level memory, in accordance with a memory constraint that not more than one embedding table is allocated to an individual bank among a plurality of banks of the second level memory, wherein the final table partitions for each of the plurality of embedding tables are indexed using learned index technique.

Furthermore, the method includes sorting the final table partitions generated by one of pre-optimizer and optimizer based on keys associated with the final table partitions to run the learned index technique to be processed by RM during inference.

Further the method includes dynamically mapping each table partition in accordance with the final table partitions to one of the first level memory and the second level memory by a heterogenous mapper executed by the one or more hardware processors on receiving a shuffle signal triggered due to change in the input access pattern.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 is a flow diagram illustrating a method for optimal deployment of embeddings tables across heterogeneous memory architecture for high-speed recommendations based on a pre-optimizer-optimizer framework, using the system of FIG. 1, in accordance with some embodiments of the present disclosure.

Figure 1:
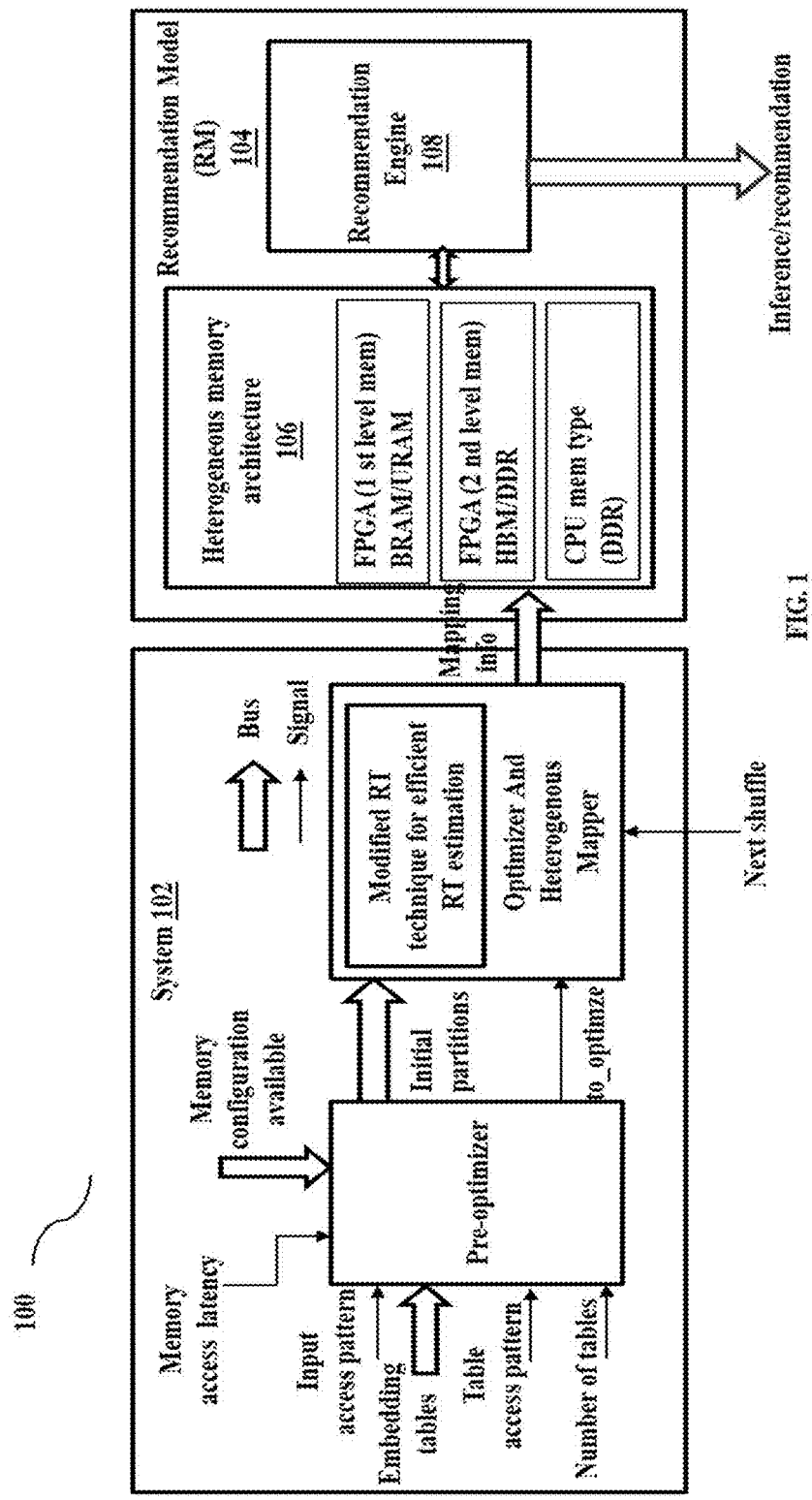
FIG. 1 is a schematic depicting a system for enhancing performance of a Recommendation Model (RM) with optimal deployment of embedding tables across heterogeneous memory architecture based on a pre-optimizer-optimizer framework, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Recently, a lot of work has been done to accelerate the embedding fetch operation of the Recommendation Models. More recently, works in the state of the art like *MicroRec: Efficient Recommendation Inference by Hardware and Data Structure Solutions. by Wenqi Jiang et.al, and FleetRec: Large-Scale Recommendation Inference on Hybrid GPU-FPGA Clusters by Wenqi Jiang et. al* have used Field Programmable Gate Arrays (FPGAs) to speed-up the inference by leveraging the High Bandwidth Memories (HBMs). MicroRec presents high speed embedding look-up operation using HBMs available on FPGAs. However, their architecture is limited to models with total embedding size of up to 40 GB (total space available in HBM+ Dual-Data Rate (DDR)). FleetRec overcame this issue by arranging the embedding tables along a cluster of FPGAs and CPUs connected by 100 Gbps TCP/IP network. In FleetRec, larger embedding tables are stored in CPU. Although MicroRec and FleetRec provides a technique to distribute embeddings along the Block Random Access Memory (BRAM), DDR, and HBMs, the larger tables are put into CPU missing out the opportunity to store the hot embeddings on to the faster memories: BRAM and an Ultra Random Access Memory (URAM), and HBM/DDR. There is neither automation involved to distribute these tables along different memory types nor any optimization to limit the number of visits to slower memory. Here, for every inference, there is a mandatory look-up from the slower memory.

Overall, these works in the literature do not leverage the embedding access patterns and memory units' access/storage capabilities that when combined can yield high-speed heterogeneous systems by dynamically re-organizing embedding tables partitions across hardware during inference.

One of the recent work of the applicant *Hetero-Rec: Optimal Deployment of Embeddings for High-Speed Recommendations, also filed as India patent application No. 202221057974, on Oct. 10, 2022*, addresses the challenges of optimal deployment of embeddings in heterogenous memory architecture by leveraging the embedding access patterns and memory units' access/storage capabilities. Both characteristics when combined can yield high-speed heterogeneous systems by dynamically re-organizing embedding tables partitions across hardware during inference. The above Hetero-Rec work was developed with understanding of the limited dataset of the embedding tables available then. However, the latest studies shows that the embedding tables may not always be skewed, and the number of tables might be very large. This would cause a lot of cache misses and increase the overall latency. Thus, it is critical to understand the nature of the embedding tables before applying any optimization.

Embodiments of the present disclosure provide a method and system for pre-optimizer and optimizer based framework for optimal deployment of embeddings tables across heterogeneous memory architecture for high-speed recommendation. The method and system, also referred to as Hetero-Rec++, disclosed herein provides an addition of a pre-optimizer to enhance the optimization during deployment of the embedding tables, wherein the pre-optimizer provides a decision whether to caching is required. Thus, the pre-optimizer can handle the variations in the input data (embedding tables not skewed or very large in number) and accordingly provide inputs to optimizer for better partitioning of the tables, effectively reducing cache misses and increase the overall latency.

Thus, the method includes a rule-based pre-optimizer or a heuristic block to determine if smaller tables should be partitioned or placed entirely in smaller memories. It also provides initial values of embedding partitions to the optimizer for better efficiency.

The earlier Hetero-Rec identified the heterogenous memory into various levels and types as mentioned below, and the same concept is applied while explaining the Hetero-Rec++ disclosed herein. The heterogenous memory architecture comprising a first level memory (BRAM and URAM) and a second level memory [High Bandwidth Memories (HBMs) and Dual-Data Rate (DDR)] of a Field Programmable Gate Array (FPGA) accelerator, and a Central Processing Unit (CPU) memory type. The BRAM and URAM is commonly referred to as Static RAM (SRAM).

Additionally, the Hetero-Rec++ reduces the number of Round Trip (RT), interchangeably also referred to (RTT), by providing improved process of placing the embeddings on HBM/DDR. Furthermore, the Hetero-Rec++ modifies overall average latency (OAL) equation of the Hetero-Rec to incorporate the modified RT that would be fed to optimizer and pre-optimizer and by modelling inter-device communication latency, latency to implement a spline-based learned index, RadixSpline, known in the art, to ensure faster index retrieval.

Furthermore, the Hetero-Rec++ provides enhancement over the priori Hetero-Rec framework by remodeling a cost function provided in terms of the Overall Average Latency (OAL) of the memory type, to include inter-device communication latencies, the latency to fetch addresses using learned index (which is a function of the number of cached embeddings), and modeling miss penalties across various cache layers.

The method disclosed dynamically partitions and organizes, embedding tables across fast memory architectures to reduce access time for embedding tables. The partitions are chosen to take advantage of the past access patterns of those tables to ensure that frequently accessed data is available in the fast memory most of the time. The partition and replication is used to co-optimize memory access time and resources. The dynamic organization of embedding tables changes location of embedding, hence needs an efficient mechanism to locate and track if a required embedding is present in the fast memory with its current address for faster look-up. The method disclosed utilizes This is done using learned index technique which provides an optimal address lookup latency with minimum memory footprint Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 is a schematic 100, depicting a system 102 for enhancing performance of a Recommendation Model (RM) 104 with optimal deployment of embeddings tables across heterogeneous memory architecture for high-speed recommendations inference using a pre-optimizer and optimizer based framework, in accordance with some embodiments of the present disclosure. The RM 104 is supported by the system 102 for providing optimal deployment of embeddings tables across a heterogeneous memory architecture 106 for high-speed recommendations or high speed inference of the RM 104.

Figure 2:
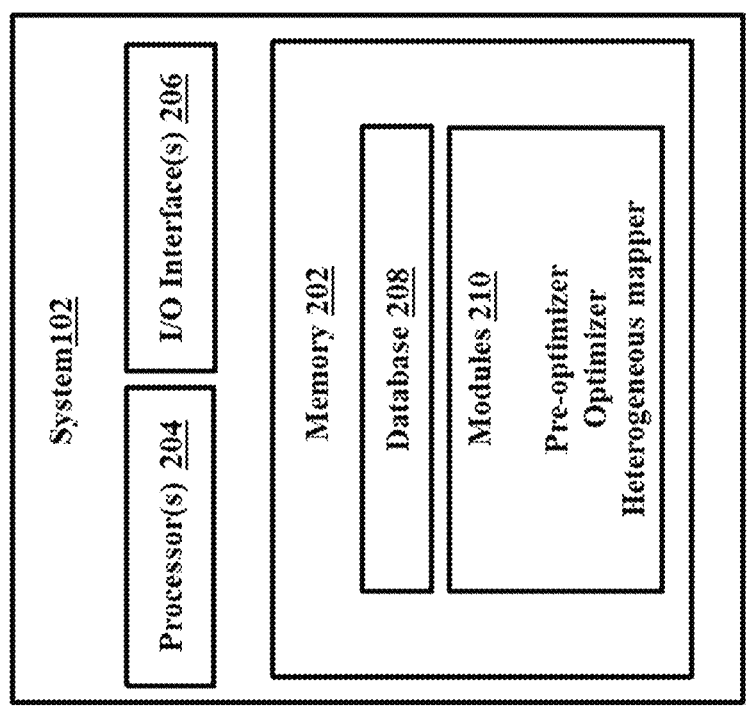
FIG. 2 is a functional block diagram of the system, also referred to as Hetero-Rec++, for optimal deployment of embeddings tables across heterogeneous memory architecture for high-speed recommendations based on a pre-optimizer-optimizer framework, in accordance with some embodiments of the present disclosure.

The RM 104 utilizes the heterogenous memory architecture 106 with FPGA-CPU combination enabling hardware acceleration for high speed recommendation or high speed inferencing. The system 102, comprises the pre-optimizer, the optimizer and a heterogenous mapper as depicted in FIGS. 1 and 2, wherein the pre-optimizer, the optimizer and the heterogeneous mapper control the optimal deployment of embedding tables across the heterogenous memory architecture 106 comprising the FPGA and the CPU system. The system 102 thus provides time efficient scanning for a recommendation engine 108 of the RM 104 to derive recommendations/inference.

A memory configuration of the heterogeneous memory architecture 106 comprises the first level memory and the second level memory of the FPGA accelerator, and the CPU memory type of the CPU system. For each memory type the memory configuration specifies capacity in terms of number of memory units, and a width and a size of each memory unit available in each memory type. It can be understood that the memory unit herein interchangeably refers to banks. For example: HBM, one type of second level memory, has a total of 8 GB space with 32 banks with each bank of size 256 MB and bus width of 32B. The CPU system with the CPU memory type supports both serial and parallel instruction processing (through multi-core configurations) but are limited by the number of CPU cores and huge latency overheads due to process switching.

The first level memory comprises Block Random Access Memory (BRAM) and an Ultra Random Access Memory (URAM), and the second level memory comprises High Bandwidth Memory (HBM) and Dual-Data Rate (DDR) memory. As well known in the art the CPU memory type comprises of mainly three levels of memory hierarchy in the order of decreasing speed namely: cache memory with a storage capacity of few Megabytes, DDR memory (as depicted in FIG. 1) with up to few hundreds of Gigabytes of storage capacity at high end servers and Solid-State Drives (SSDs) that can store up to a few Terabytes of data. FPGAs are known to support deep pipelines owing to their data path based compute paradigm. FPGA device is the programmable silicon that realizes the desired functionality. This entails a matrix of logic blocks (Look-up table (LUT) arrays, Block RAMs (BRAM), Ultra RAMs (URAMs), Digital Signal Processors (DSPs), Flip-flops (FFs)) connected through programmable interconnects and I/Os. The LUT RAM and BRAMs are also referred to as registers.

Figure 4:
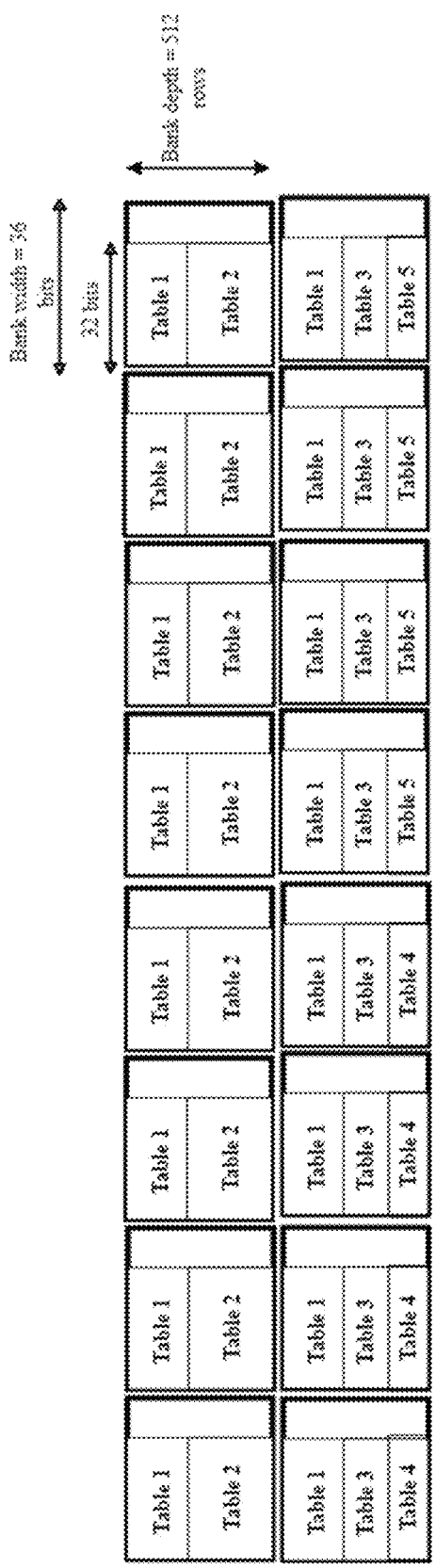
FIG. 4 is an example embedding distribution over 16 banks of Block RAM (BRAM), a first level memory of the Field Programmable Gate Array (FPGA) of the RM, in accordance with some embodiments of the present disclosure.

In one implementation, the RM model 104 herein utilizes FPGA with Alveo U280™ datacenter, which contains 9k+ DSPs, 2607K registers, 45 MB on-chip SRAM (URAM+BRAM), 16 GB DDR, and 8 GB HBM (High-Bandwidth Memory). These FPGA memories can be partitioned, and each partition can be accessed randomly in parallel (as shown in FIG. 4 for BRAM) as opposed to streamlined memory accesses in Graphics processing units (GPU's) HBM. FIG. 4 is an example embedding distribution over 16 banks of BRAM, in accordance with some embodiments of the present disclosure. BRAMs could be partitioned into 4032 banks with 18 Kb capacity each and URAMs up to 960 banks with 36 KB each which favors parallel lookups. Furthermore, 34 parallel lookups are supported from 32-port HBM banks (256 MB/bank) and 2-port DDR DRAM banks (8 GB/bank).

The HBM and DDR fetch data in the multiples of 32 and 64 bytes per bank, respectively and would take an average access latency of 63 (56+7) and 31 (28+3) cycles, respectively to fetch a 64-dimension floating-point (FP32) vector. For HBM, it is around 315 ns @200 MHz clock frequency as compared to an average measured latency of 16 us on a high end CPU server to fetch the same amount of random data. The BRAM and URAM support single-cycle access of 36b and 72b, respectively. On the Alveo U280™ card, one can fetch up to 34 embedding tables (from 32+2=34 different banks) in parallel with an average initial start-up latency of 56 and 28 cycles. The availability of large and diverse re-configurable memory units generates a huge potential to accelerate memory bound models available in the literature with to high-speed random memory accesses. The CPU system supports both serial and parallel instruction processing (through multi-core configurations) but are limited by the number of CPU cores and huge latency overheads due to process switching. Modern CPUs can leverage SIMD (single Instruction Multiple Data) parallelism to improve throughput for larger batches.

The system 102, using the pre-optimizer-optimizer framework enhances performance of the RM 104 with optimal deployment of embedding tables across the memory types by dynamically partitioning and organizing embedding tables across fast memory architectures to reduce access time for embedding tables. The partitions are chosen to take advantage of the past input access patterns of those tables to ensure that frequently accessed data is available in the fast memory most of the time. The partition and replication is used to co-optimize memory access time and resources. The dynamic organization of embedding tables changes location of embedding, hence needs an efficient mechanism to track if a required embedding is present in the fast memory with its current address for faster look-up. Thus, the method leverages spline-based learned index, Radix spline, known in the art, to ensure faster look up. Thus, the system 102 is the Hetero-Rec++ framework for optimal deployment of embedding tables of recommendation engine 108, dynamically across heterogeneous memory architecture to ensure faster access to the embedding needed during an inference. The system 102 leverages specific access features of memory architecture, past access patterns, partitioning, and replication of embedding data, and learned index on the embedding data for faster access. The Optimization problem formulation to output <partition, memory type> pairs for all embedding tables across all available memory types, constraining to the capacity and features of the heterogeneous memory architecture and utilizing the history of embedding tables' access pattern. Performance model is provided to estimate access latency of embedding tables spread across heterogeneous memory.

Preliminaries:

Hardware Platforms Characteristics: Data processing is empowered by three dominant platforms: CPU, GPU, and FPGA. These hardware platforms operate on different operation paradigms and consequently have different strengths and capabilities for supporting workloads. CPU comprises of mainly three levels of memory hierarchy in the order of decreasing speed namely: cache memory with a storage capacity of few Megabytes, DDR memory with up to few hundreds of Gigabytes of storage capacity at high end servers and Solid-State Drives (SSDs) that can store up to a few Terabytes of data. CPU system supports both serial and parallel instruction processing (through multi-core configurations) but are limited by the number of CPU cores and huge latency overheads due to process switching [14]. Modern CPUs can leverage SIMD (Single Instruction Multiple Data) parallelism to improve throughput for larger batches.

Graphics Processing Units (GPUs) are many-core architectures (up to thousands of cores) suited to solve problems that can be expressed as data-parallel computations with high arithmetic intensity the ratio of arithmetic operations to memory operations. The GPU compute unit, streaming microprocessors (SM), contain double precision, single precision, int, and tensor processing cores. The SMs contain dedicated and shared hierarchical cache system (L0, L1, and L2) for instruction and data. Modern GPUs are equipped with HBMs that provides high throughput for streamlined memory accesses but don't perform well for random memory accesses [19]. Furthermore, they have higher start up latency and incorporate extra communication costs, making it more suitable for larger batches. The SIMD hardware units in both CPUs and GPUs are highly practical at scaling up computations but are of little help when randomly looking up data in embedding tables.

FPGAs are well-known for supporting deep pipelines owing to their data-path based compute paradigm. FPGA device is the programmable silicon that realizes the desired functionality. This entails a matrix of logic blocks (Look-up table (LUT) arrays, Block RAMs (BRAM), Ultra RAMs (URAMs), Digital Signal Processors (DSPs), Flip-flops (FFs)) connected through programmable interconnects and I/Os. Alveo U280 [8] is a Data Center FPGA and contains 9k+ DSPs, 2607K registers, 45 MB on-chip SRAM (BRAMs and URAMs together are referred to as SRAMs), 16 GB DDR, and 8 GB HBM (High-Bandwidth Memory). These memories can be partitioned, and each partition can be accessed randomly in parallel (as shown in FIG. 4) as opposed to streamlined memory accesses in GPU's HBM. BRAMs could be partitioned into 4032 banks with 18 Kb capacity each and URAMs up to 960 banks with 36 KB each which favors parallel lookups. Furthermore, 34 parallel lookups are supported from 32-port HBM banks (256 MB/bank) and 2-port DDR DRAM banks (8 GB/bank). The average latency of different memory architecture to fetch the first set of bytes of data is tabulated in Table-T1.

TABLE- T1

Average latency of various Memory Blocks

|  | BRAM | Memory URAM | HBM | DDR |
|---|---|---|---|---|
| Latency (in clock cycles) | 2 | 2 | 55 | 27 |
| Bits Transferred/clock | 36 b | 72 b | 32 B | 64 B |
| Total Capacity | 9 MB | 35 MB | 8 GB | 32 GB |

The HBM and DDR fetch data in the multiples of 32 and 64 bytes per bank, respectively and would take an average access latency of 63 (56+7) and 31 (28+3) cycles, respectively to fetch a 64-dimension floating-point (FP32) vector. For HBM, it is around 630 ns @100 MHz clock frequency as compared to an average measured latency of 13.5 us on a high end CPU server to fetch the same amount of random data. The CPU frequency was set to maximum using "cpupower f requency-set-gper f ormance" while taking the measurements. The BRAM and URAM support single-cycle access of 36b and 72b, respectively. On the Alveo U280 card, one can fetch up to 34 embedding tables (from 32+2=34 different banks) in parallel with an average initial start-up latency of 56 and 28 cycles. The availability of large and diverse re-configurable memory units generates a huge potential to accelerate memory bound models as from study in literature, which is possible due to high-speed random memory accesses.

Input data access Pattern: Study shows that for Criteo Terabyte dataset, about 400 MB out of total 61 GB (0.7%) of all the embedding records cater to around 81.6% of the input queries (or total user arrivals). This study shows that in a real-world scenario, very few records (hot embeddings) contribute to the majority of the queries that can be cached to achieve high performance. Motivated by this concept, the input pattern for Taobao dataset that has 8 embedding tables is analyzed.

When the input pattern for 8 different tables on an eighth day data in publicly available Taobao dataset is studied, it is noticed that the graph depicts number of queries satisfied by N records (or N embeddings). It is observed that for an adgroup_id table, 70% of input queries are satisfied by around 44 k records (5.205% of total records). Similar trends are observed for the rest of the tables except for the user table which is less skewed. It is because user arrivals contribute to input queries. But, still, it is slightly skewed since few users might have arrived multiple times in the duration of eight days contributing to a greater number of queries than the actual number of distinct users. Similarly, the input pattern for publicly available Avazu dataset is analyzed with 14 tables as shown in Table-T2. It is observed that embeddings' pattern changes with time that would require large amount of storage to log the access patterns. The change in access pattern depends on various factors like rush evening hours, ongoing sales, seasons like winter, summer that would change the purchasing pattern and, users getting dormant to the website with time.

TABLE-T2

Avazu Dataset Analysis

| Table | % Queries | Total Entries |
|---|---|---|
| Table1 | 0.54 | 4738 |
| Table2 | 0.25 | 7746 |
| Table3 | 11.11 | 27 |
| Table4 | 0.12 | 8553 |
| Table5 | 0.36 | 560 |
| Table6 | 5.41 | 37 |
| Table7 | $3.72 \times 10^{-5}$ | 2686409 |
| Table8 | 21.84 | 6729487 |
| Table9 | 3.56 | 8252 |
| Table10 | 7.80 | 2627 |
| Table11 | 17.20 | 436 |
| Table12 | 15.94 | 69 |
| Table13 | 6.35 | 173 |
| Table14 | 19.67 | 61 |

Explained below is the approach followed by the Hetero-Rec is utilizing the input access pattern for determining optimal partition of embedding tables and the later the enhancement provided by the system 102 (Hetero-Rec++) disclosed herein.

Figure 5:
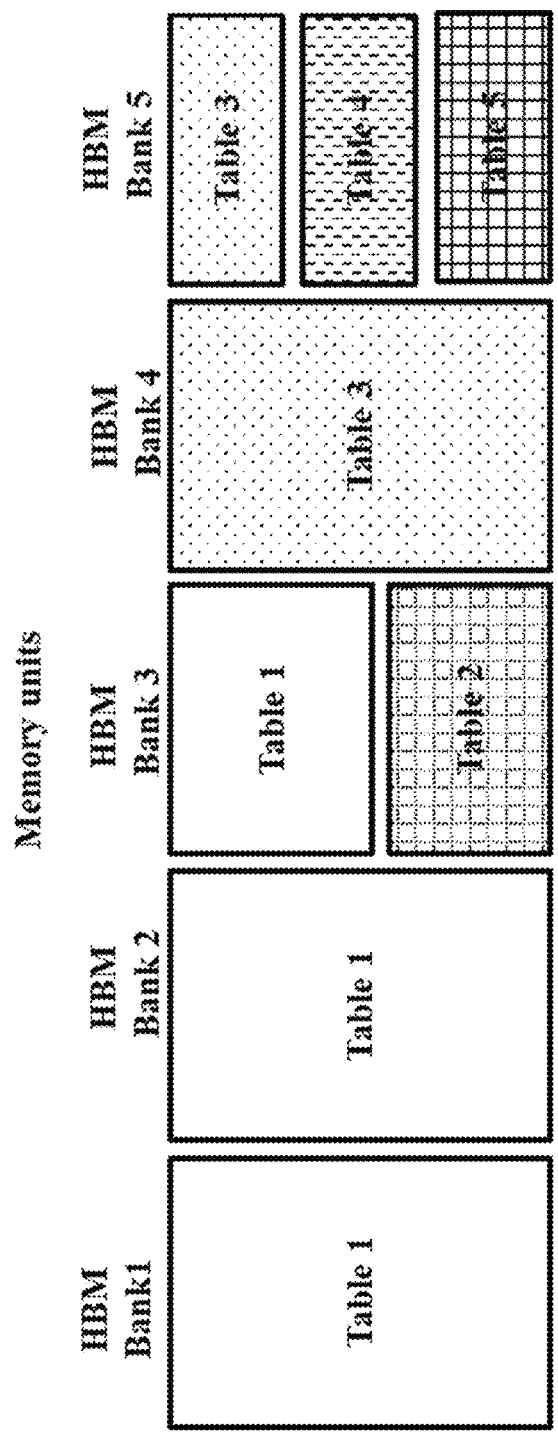
FIG. 5 illustrates example placement of table partitions on second level memory, High Bandwidth Memory (HBM), of the FPGA, in accordance with some embodiments of the present disclosure.

Hetero-Rec: Recent work of the applicant Hetero-Rec: Optimal Deployment of Embeddings for High-Speed Recommendations, also filed as India patent application No. 202221057974, on Oct. 10, 2022, addresses the challenges of optimal deployment of embeddings in heterogenous memory architecture by leveraging the embedding access patterns (history of input access pattern) of individual tables and memory units' access/storage capabilities before dynamically partitioning and allocating them in different memory hierarchy treated as different cache levels. The most frequent embeddings are placed in the fastest memory (for e.g., BRAM/URAM of FPGA) and least frequent embeddings on the slowest memory architecture (for e.g., DDR of CPU). Optimization and heterogeneous mapper in FIG. 5 provides partition information (<partition, memory unit> pairs) for organizing embedding tables dynamically across heterogeneous memory architecture. Throughout Hetero-Rec and the current work, j=1 is considered for SRAM (i.e., URAM/BRAM), j=2 for FPGA's HBM and DDR combined, and j=3 for CPU memory. The HBM and DDR of the FPGA are considered as a unified memory type comprising 34 banks. This approach allows us to take advantage of the larger banks in HBM (32 HBM banks and 2 DDR banks) and the increased capacity of DDR (8 GB HBM and 32 GB DDR) to facilitate simultaneous memory fetch operations. However, if DDR (which offers lower latency) is treated as the second-level cache, the number of parallel embedding fetches would be limited. On the other hand, considering HBM as the second-level cache would not accommodate a larger number of embeddings, both of which would result in significant additional latency. Table-T3 summarizes the description of all the parameters used in Hetero-Rec and Hetero-Rec++.

TABLE -T3

Description of Parameters used

| Parameter | Description |
|---|---|
| $X_{ij}$ | # Records to cache in $j^{th}$ memory from the $i^{th}$ embedding table |
| i | Table Number (Iterator) |
| j | Cache Number (Iterator) (1-SRAM, 2-HBM/DDR, 3-CPU DDR) |
| $m_i$ | Total number of records in $i^{th}$ table |
| n | Total number of embedding tables |
| k | Total number of caches |
| $V_i$ | Record Size for $i^{th}$ table |
| $S_j$ | Total size of $j^{th}$ memory |
| $a_i$ | Number of accesses required from $i^{th}$ table for 1 inference |
| $C(X_{ij})$ | CDF of the embedding table for records sorted according to popularity |
| $G(X_{ij})$ | Percentage of queries resolved by caching X number of records from $i^{th}$ table in $j^{th}$ cache |
| $b_j$ | Number of banks in $j^{th}$ memory |
| $H_j$ | Latency of the $j^{th}$ memory (Assumed 150 clock cycles for CPU ($H_3$) for modelling purpose) |

Learned Indexing mechanism, RadixSpline: Since embedding address keeps changing during dynamic caching, the array-based lookups used in accessing embedding tables are not possible. So, RadixSpline well-known in the art, a learned index technique is used as an indexing mechanism to keep the storage overhead to minimum and provide fast lookup time. Radix Spline is used to fetch embeddings from the partitioned table with sorted keys by reducing the search space using spline points. It is tuned by two hyper-parameters: spline error and the number of radix bits. To get the location of a cached item, one need to access 2 tables-Radix table and the spline table (represented as key/indexpairs). The Radix table stores few of the spline points based on the 'r' significant bits of the key to reduce the scope of search to a specific range of spline points, whereas the spline table stores all the spline points based on the pre-defined spline error (sp_err). A query for the kth key would be searched in the Radix table based on r prefix bits. Say, r=10 then total search points in the Radix table would be 210=1024. Then, the two spline points surrounding the key would be binary searched followed by a linear interpolation between those two pints to obtain an estimated position (say 'p') of the key. Binary search is again performed to find the key (if present) within the error bound (p±sp_err). This process is well known via one of the work in the literature RadixSpline: A Single-Pass Learned Index.

Since, RadixSpline uses binary search at the last level to reduce the search space to know whether an embedding vector is cached or not. For HBM and DDR, each step of the binary search would entail a round trip (RTT) to HBM/DDR. Thus, to increase the speed of this last level search in RS, all keys for HBM and DDR are stored in an index table in SRAM (BRAM/URAM). The Hetero-Rec framework models the index table's memory utilization cost per key as $\lceil \log_2(X) \rceil$ bits (address bus width) and the total memory utilization cost to store X keys in an index table would be $X * \lceil \log_2(X) \rceil$ bits. The overall memory consumed by the Spline parameters and index table is given by the U in Equation 1. Here, Xi2 denotes number of records of ith table stored in HBM/DDR and $X_{i1}$ denotes number of records of ith table stored in SRAM. Either BRAM or URAM is considered for storing RS (RadixSpline) parameters. If BRAM is chosen as L1 cache then URAM would be chosen to store the RS parameters and vice-versa.

$$U = \sum_{i=1}^{n} (X_{i2} * \lceil \log_2(X_{i2}) \rceil + 0.02 * X_{i2} + 0.02 * X_{i1}) \quad (1)$$

Formulating Input Access Pattern: The probability (or input pattern—$G(X_{ij})$) of queries satisfied by number of records from ith table stored in up to (j)th cache is obtained from the CDF ($C(X_{ij})$) using the equation 2, where, CDF ($C(X_{ij})$) is obtained by dividing the graphs of input pattern for 8 different tables on an eighth day data in Taobao dataset by total number of records in each table. The graphs provide number of queries satisfied by N records in the table (embedding table)

$$G(X_{ij}) = C\left(\sum_{q=1}^{j} X_{iq}\right) - C\left(\sum_{q=1}^{j-1} X_{iq}\right) \forall j > 1 \quad (2)$$

These access patterns are leveraged to cache the most frequent records on the fastest memory dynamically. From Table-T1, it can be observed that the on-chip SRAM memories have the lowest latency followed by the FPGA's HBM/DDR. The remaining least popular records could reside on CPU memory saving FPGA's memories.

SYNTHESIZING ACCESS PATTERN: The publicly available datasets typically have a smaller number of tables. However, in a practical scenario, several hundred tables are feasible as provided by work in the art Wenqi Jiang, Zhenhao He, Shuai Zhang, Kai Zeng, Liang Feng, Jiansong Zhang, Tongxuan Liu, Yong Li, Jingren Zhou, Ce Zhang, and Gustavo Alonso. 2021. FleetRec: Large-Scale Recommendation Inference on Hybrid GPU-FPGA Clusters, Association for Computing Machinery, New York, NY, USA, 3097-3105. https://doi.org/10.1145/3447548.3467139]. To test the framework on such a large dataset, an artificial dataset was synthesized using the existing access pattern. The above work states that there are approximately 350 embedding tables with an overall size of 114 GB. The largest embedding table contains around 200 million entries with an embedding dimension of 64, resulting in a size of 52 GB. Furthermore, the overall feature length (concatenation of all embeddings) is 3968. Based on this information, 350 tables were generated with different dimensions (64, 32, 16, 8, 4) such that the sum of their dimensions is equal to 4036, which is very close to 3968. Dimensions of the embedding vectors are set proportional to number of table entries (as observed in study published). Hence, embedding tables (also referred to as tables) are categorized with a dimension of 64 as "large" with total entries above 106, tables with dimensions 32 and 16 as "medium" with entries between 104 and 106, and tables with dimensions 8 and 4 as "small" with entries between 10 and 1000. By considering these constraints, a total number of entries for each table were obtained, ensuring that the sum of their sizes is around 114 GB while keeping Table0 with 200 million entries. To generate the access pattern for each of these tables, the 32 access patterns retrieved for 8 tables of the Taobao dataset for 1 week, 1 day, 1 hour, and 1 minute were leveraged. The hit rate was sampled upon caching x % of data from each of these 32 access patterns, as shown in Table-T4. These 32 access patterns were assigned among the 350 tables in a round-robin order and linearly interpolated the access pattern to cover all the entries in each table.

TABLE -T4

Sampled access Patterns

| % of table cached | Hit rate upon caching x % of the table (in %) | | | |
|---|---|---|---|---|
| | Table1 | Table2 | Table31 | Table32 |
| 0 | 0 | 0 | 0 | 0 |
| 1 | 22.98160239 | 36.60509555 | 0 | 0 |
| 2 | 32.0826324 | 47.49341262 | 55.9683313 | 0 |
| 3 | 37.87486547 | 54.58782773 | 55.9683313 | 0 |
| 4 | 42.3239269 | 59.87637003 | 59.62241169 | 0 |
| — | — | — | — | — |
| 97 | 99.87102926 | 99.90434507 | 99.93909866 | 100 |
| 98 | 99.91401825 | 99.93623004 | 99.93909866 | 100 |
| 99 | 99.95701101 | 99.96811502 | 100 | 100 |
| 100 | 100 | 100 | 100 | 100 |

HETERO-REC++ FRAMEWORK: The system 102: As depicted in FIG. 1, the system 102 comprises the pre-optimizer block followed by the optimizer and the heterogenous mapper. Optimization and heterogeneous mapper from Hetero-Rec provides partition information (<partition, memory unit> pairs) for organizing embedding dynamically across heterogeneous memory architecture. Also, the output partitions are arranged in a sorted order based on their keys. This arrangement enables the utilization of binary search during the address retrieval step in RS. This is depicted in step 17 of Algorithm 2. The pre-optimizer block provides the initial partition values for the optimizer block. It also analyzes if it is reasonable to partition and cache the embeddings. At times, it is more efficient to store the smaller tables completely onto the smaller memories rather than cache the partitions of the tables. This saves the memory to store RS parameters. Also, for the very large number of embedding tables, the benefit of partitioning the tables on SRAM (first level memory) is negligible. For e.g., consider a recommendation model (RM104) with 350 embedding tables and intended is to partition it on the fastest memory (say BRAM) which has a capacity of around 9 MB with 4096 banks. To achieve a minimum 5% speedup, it is crucial for each query to retrieve all 350 embeddings from the BRAM. Even if a single table partition on the BRAM experiences a miss, it necessitates a mandatory round-trip to the next-level cache, resulting in additional latency equal to that of the next-level cache. Consequently, the product of the hit probabilities for each of these 350 partitions must be at least 5% to meet the threshold for caching to be deemed beneficial (Falling below this threshold renders the caching effect insignificant). Assuming no space constraints, even in the hypothetical scenario where 99% of all embedding tables are partitioned and cached on BRAM, the overall hit rate is found to be less than 5% (0.99350<5%). Due to space constraints, achieving a combined hit rate of even 5% for any combination of table partitions is impractical. The inputs to the framework are available memory configurations (HBM, DDR, BRAM, and URAM along with number of banks and size of each bank available in that memory), total number of tables (#Tables) in the system, embedding tables, input access pattern $G(X_{ij})$, and table access pattern ($a_i$) of each table. The framework outputs the most optimal distribution of embeddings across different memories for n-FPGAs.

Modelling address lookup latency in Learned Index (modified RT technique for computation of number of Roun trip (RT): The popular embedding records are extracted by running the Hetero-Rec++ (Algorithm 2) and these are stored in the sorted order according to their keys so that binary search can be done. In earlier work Hetero-Rec, the time taken to search through the spline points is assumed to be hidden by pipelining the index retrieval with the embedding retrieval of previous index for continuous embedding lookups. This assumption is more appropriate when HBMs/DDRs are used to lookup an embedding while the RadixSpline data are looked up in SRAM. For BRAM or URAM as cache, the embedding lookup latency would be much lesser than the latency to retrieve the address which would be a function of amount of data cached. However, in work in the art RadixSpline: A Single-Pass Learned Index, it is observed that the latency is minimum when spline error is minimum and radix bits are maximum, and vice versa.

The system 102 assumes the worst-case scenario with maximum spline error of 1024 and minimum number of radix bits (10) as depicted in RadixSpline: A Single-Pass Learned Index for a dataset with 200M key/value pairs. This would count to a latency of $\log_2 (1024)=10$ clock cycles. The linear-interpolation step accounts to an approximate latency of 6 clock cycles obtained by synthesizing the linear-interpolation equation at 200 MHz. It is observed that saw, for X keys or embeddings cached, total spline parameters size would be 0.02*XB. Taking one entry to be 32 bits (or 4 Bytes), total entries in radix and spline tables is equal to 0.02*X/4. Hence total number of spline points is equal to (0.02*X/4)−1024≈(0.02*X/4) for large number of spline points/. The worst-case binary search latency to obtain two spline points surrounding the key would be $\lceil \log_2 (0.02*X/4) \rceil$ clock cycles. Thus, RS latency (rs_lat) can be given by equation 3.

$$\text{rs\_lat} = \max\left(\left\lceil \log_2\left(\frac{0.02 \cdot X_i}{4}\right) \right\rceil + 10 + 6\right) \quad (3)$$

Here, when multiple embeddings are fetched in parallel, the overall latency is governed by the one with maximum RS latency.

Formulating the Latency Equation: High-speed embedding fetch operation could be achieved by parallel fetching of multiple embedding vectors and from faster memories. The availability of large number of banks in SRAM (BRAM/URAM) and HBM/DDR on FPGA facilitates efficient parallel retrieval of multiple embeddings. The latency equation (referred to as 'Average Parallel Latency') incorporating the address lookup latency when implementing the RadixSpline algorithm and the additional latencies due to miss penalties across various cache layers could be modelled using the Equation 4.

$$APL = \qquad (4)$$
$$\sum_{j=1}^{k-1} \left( (L_j - L_{j-1}) \cdot \left( (RTT_j \cdot H_j \cdot \sim (\text{is\_cached})) + \sum_{j1=1}^{j} (RTT_{j1} \cdot H_{j1}) + (\text{rs\_lat}.[j=1]) \right) \cdot \text{is\_cached} \right)$$

-continued

Where $L_j = \prod_{j=1}^{n} \frac{a_i}{r_{ij}} \cdot C\left(\sum_{q=1}^{j} X_{iq}\right)^{a_i}$ and $r_{ij} \le a_i$ Here, $L_j$ represents the probability of finding the embeddings by scanning all the caches up to $j^{th}$ cache, $\Pi$=Product of terms and $L_0$=0. The Boolean variable is_cached is employed to accumulate miss-penalties exclusively at the lower level cache when embeddings are partitioned in SRAM [12, 16, 24]. Miss-penalty is ignored when smaller embeddings are entirely stored in SRAMs. The inclusion of RS latency is limited to the SRAM (j=1) for the reason discussed earlier. In the Equation 4, the replication parameter $r_{ij}$ (same as Hetero-Rec) is used, which represents r replications of the $i^{th}$ partition on the $j^{th}$ cache or memory. This replication is particularly useful in models such as Deep Learning Recommendation Model (DLRM), where each table is accessed multiple times and the number of tables is relatively small (around 8 ~12). Replicating these tables allows to avoid multiple round trips (RTT), and it also offers the advantage of meeting the Service Level Agreement (SLA) constraint by scanning a batch of say 512 products. Without replication, one would expect 512 sets of embedding fetches for each query or user arrival. However, with a replication factor of four, a set of four embedding fetches can be performed in a single operation, thereby increasing the scope for batch size improvement under the given SLA and enhancing overall inference quality. In the case of SRAMs, the replication factor to is set to 1 ($r_{i1}$=1, ∀i) and prioritize serial access over replication due to the lower latency and capacity of SRAMs.

In the APL equation 4, the maximum RTT (number of embedding table partitions) per SRAM bank is also limited to one. This is achieved by obtaining an estimated SRAM banks (Est_Banks$_{Bi}$) for each bank given by Equation 5 and then, limiting the overall estimated SRAM banks (Est_Banks$_B$=$\Sigma_{i=1}^{n}$Est_Banks$_{Bi}$ to less or equal to total SRAM banks available. By doing so, it is ensured that only one table partition is stored in each of the banks.

$$\text{Est\_Banks}_{Bi} = (V_i * 32/W_{BW}) * \lceil X_{i1}/W_{BD} \rceil \quad (5)$$

where $\lceil x \rceil$ is the ceiling of x. Here 32 corresponds to 32 bits in floating point (FP32) number and $W_{BW}$ and $W_{BD}$ corresponds to the width and depth of the SRAM bank, respectively. Although SRAMs' dual-port nature allows for two simultaneous reads from the same bank, placing multiple tables on a single bank is avoided to prevent fragmentation issues and memory waste. Tables vary in width (dimension of individual embedding vector) and total record count. For example, in FIG. 4, Table 1 (112 records) with $R^{16}$ embeddings a combination of Table 3, Table 4 and Table 5 are stored. Here, Table 3 $R^{16}$ embeddings and Table 2 (400 records) with $R^8$ embeddings would occupy 16 and 8 SRAM banks, respectively. The first 8 banks are fully utilized, while the remaining 8 banks contain empty rows that can accommodate various combinations. In the last eight banks, a combination of Table 3 ($R^8$), Table 4 ($R^4$), and Table 5 ($R^4$) is stored. With a larger number of tables, larger combinations will arise.

The APL is proportional to the maximum number of round trips (RTT j=2) to the HBM/DDR. When the number of tables partitions exceeds the available banks (b2 from Table 3), the round trips to the HBM increase beyond one. Additionally, if some tables are significantly larger and span multiple banks, smaller tables will accumulate in later banks, leading to increased RTT. To address this issue, earlier work 'Hetero-Rec' adopts a sorting approach where table partitions are arranged in descending order based on their size. The largest partition is placed first, followed by the smallest, then the second largest, and so on in a sequential manner.

One limitation of this Hetero-Rec approach is that the embedding placement often leads to the accumulation of multiple embedding tables in a few banks, exceeding the ideal distribution. This issue arises because the algorithm does not actively optimize the round-trip time (RTT) or RTs; instead, it relies on an alternating placement strategy for the table partitions. To assess the impact, an analysis of the RTT or RT was conducted on a large, synthesized dataset comprising 350 embedding tables using a two-FPGA system. The results revealed that the maximum RTT across multiple banks of HBM/DDR was measured at 37 units.

Hence, the system 102 herein discloses a better approach for packing the embeddings across the HBM/DDR banks. To optimize the RTT, iteration is performed from 'test_RTT' equal to one up to 'n' (the total number of embedding tables) in the Algorithm 1. During each iteration, an attempt is made to allocate at most 'test_RTT' table partitions per bank. The loop terminates either when all embedding partitions are successfully placed or when there are no more available banks to accommodate the partitions. In HBM and DDR (second level memory of FPGA), the entire embedding vectors are stored in a single bank, unlike SRAM (first level memory of FPGA), where one vector is stored across multiple banks. This makes it easy to get the address offset and to pack multiple table partitions on a single bank. Thus, optimizer of the system 102 herein attempts to place minimum partitions in single bank among a plurality of banks available in of the second level memory to maintain the maximum RT across the plurality of banks of second level memory to a minimum value to manage storing all table partitions across a plurality of banks of the second level memory. The maximum number of partitions are determined by iteration number of partitions from 1 to the total number of the plurality of embedding tables in the RM model. The placement of partition is done alternatively based on size of the plurality of embedding tables.

The detailed method to distribute the table partitions and calculate the RTT$_{j=2}$ is described in Algorithm 1. In the algorithm, the initial elements (2×total number of FPGAs) of the vector 'bank_size' represent DDR banks, each with a capacity of 16 GB. The modified RT technique as in algorithm 1 achieved an RTT of 18 for the same dataset on two-FPGA system.

The latency for fetching partitions from the CPU or the miss penalties from FPGA memories is not included in the system 102 (pre-optimizer optimizer framework). For CPU, it is assumed that the embedding partitions are fetched sequentially, while for FPGA memories, the embeddings are fetched in parallel. The system's 102 overall Average Latency (OAL) can be computed using Equation 6.

$$OAL = \quad (6)$$
$$APL + \sum_{i=1}^{n}\left(a_i \cdot G(X_{ik}) \cdot \left((H_k \cdot \text{no\_cached}) + \sum_{j=1}^{k}(H_j) \cdot \sim \text{no\_cache}\right)\right) +$$
$$\text{comm\_Latency} \cdot \textit{no.FPGAs}$$

Algorithm 1: Finding RT or RTT

Inputs:
- x: Vector of number of cached records in HBM/DDR for each embedding table
- V : Vector of record size for each table
- n: Total number of embedding tables
- total_banks: Total number of banks
- bank_size: Vector containing the size of each bank Output:
  - Output:
    Round Trips impacting the APL (RTT)

```
1: function find_RTT (x,V,n,total_banks,bank_size)
2: break_out_flag ← False
    3:      for test_RTT in range(1,n − 1) do
    4:          X ← Sort(x × V × 4)         ◁ sort the table
partitions in descending order of their size. Here 4 is the size of FP32
numbers in the embedding record
    5:          if break_out_flag then
    6:              break
    7:          i ← 0
    8:          bank ← 0
9: bank_size_temp ← copy(bank_size)
10: RTT ← array([0] × total_banks)
   11:          while True do
   12:              if RTT [bank] ≥ test_RTT then
   13:                  bank ← bank + 1
   14:              if bank == total_banks then
15: break ◁ Exceeds available banks after bank++ in Step 13
16: space_left ← bank_size_temp[bank]−(X [i]/1e6)
   17:              if space_left < 0 and X [i] > 0 then
   18:                  if bank == total_banks − 1 then
   19:                      break ◁ Last bank cannot accommodate remaining partitions
   20:                  RTT [bank] ← RTT [bank] + 1
   21:                  X [i] ← ceil((−1) × space_left × 1e6)
   22:                  bank ← bank + 1
   23:              else
   24:                  bank_size_temp[bank] ← space_left
   25:                  if $X[i] > 0$ then
   26:                      RTT [bank] ← RTT [bank] + 1
   27:                  if i == n/2 then
   28:                      break_out_flag ← True
   29:                      break              ◁ All the partitions placed
   30:                  if i ≤ floor(n/2) then
   31:                      i ← n − (i + 1)
   32:                  else
   33:                      i ← n − i ◁ Selects partitions alternately based on size
34: return max(RTT)
```

Here, no_FPGAs is the total number of FPGAs being used and $G(X\_ik)$ denotes the Percentage of queries resolved by caching X number of records from ith table on the CPU. $G(X\_ik)$ is zero for FPGA memory hits and one for placing an entire table on CPU memory. For the later scenario, the miss penalty on previous cache layers using the Boolean no_cache is ignored. To calculate comm_latency, the transfer latencies from CPU to FPGAs (C2H_lat) and from FPGA to CPU (H2C_lat) are summed. Xilinx's QDMA DPDK Driver known in the art is employed and benchmarking tools to measure C2H and H2C latencies are used. By varying the batch size with the 'dma_to_device' and 'dma_from_device' commands, data transfer latencies for CPU-FPGA and FPGA-CPU communication over PCIe Gen 3 are obtained. The communication latency can be modelled using the Equation 7.

$$C2H\_lat / H2C\_lat = IL + (BS - 1)/\text{Throughput} \quad (7)$$

Here, IL is Iteration latency and BS is the Batch Size. The Batch Size is selected to be a multiple of 64 Bytes, aligning with the PCIe transfer size per cycle. Solving the above Equation 7 for variables IL and Throughput using the latencies obtained for various batches. It is found the IL for H2C and C2H to be 1.84 µs and 4.2 µs, respectively and Throughput to be 519 MB/s and 73 MB/s, respectively.

Pre-optimizer: The pre-optimizer block aims to retrieve initial partition values and determine whether smaller tables should be partitioned or placed entirely in smaller memories. Based on this analysis, a decision is made on whether further optimization using an optimizer is necessary to improve efficiency or if optimization can be skipped to speed up the process. The total entries are sampled from each table's cumulative distribution function (CDF) to meet the multiples of 5% hits on queries, as shown in Table-T5. These sampled values are used to calculate the total percentage (product of probabilities) for each combination (constituting of same percent per table) of the sampled CDF. The combinations are then sorted in descending order based on the total percentage. The combinations that do not satisfy at least a 5% hit rate as disregarded, as shown in Table-T6. These values are pre-computed and saved in advance.

TABLE -T5

Entries satisfying x % queries from the embedding table

| Table_no | % Queries | Total_Entries |
|---|---|---|
| 0 | 5 | 0 |
| 0 | 10 | 20 |
| 0 | 15 | 700 |
| 0 | ... | ... |
| 0 | 100 | 200000 |

There are a few important constraints to consider:
(1) The overall caching should not exceed the total memory available on the FPGA (SRAM+HBM+DDR). The memory available on registers is ignored as it is required to temporarily store retrieved and concatenated vectors.
(2) The memory utilized by the learned index technique/ learned index algorithm should be less than the total space available on SRAM.

TABLE -T6

Initial permissible combinations of table partitions

| Perct_per_table | n_tables | total_perct |
|---|---|---|
| 100 | 26.0 | 100 |
| 95 | 1.0 | 95 |
| 95 | 2.0 | 90 |
| ... | ... | ... |
| 55 | 5.0 | 5 |
| 5 | 1.0 | 5 |

The pre-optimizer block calculates the OAL for each initial permissible combination of table partitions, considering SRAMs and then HBM/DDR, while ensuring these constraints are satisfied and selects the best combination. When none of the combination meets the 5% criteria, 'N' smallest embedding tables are stored in SRAMs without any partition.

The entire framework of system 102 is summarized in the Algorithm 2.

| Algorithm 2 Hetero-Rec ++ Framework |
|---|
| 1:     if model = small (up to 25 embedding tables) then |
| 2:Run the pre-optimizer for SRAM caching |
| 3:         Run the optimizer with the space constraints using the output partition values from the previous step as a starting point |
| 4:            Calculate the RTT (Round-Trip Time) for the remaining embeddings |
| 5:if find_RTT(for remaining embeddings) > 1 then |
| 6:Run the pre-optimizer for HBM/DDR caching |
| 7:         Run the optimizer with the space constraints using the output partition values from the previous step as a starting point |
| 8:        else |
| 9:Push the remaining embeddings onto HBM/DDR, en-suring not more than 1 table is allocated to an individual bank |
| 10:       else if model = medium (between 25 to 100 embedding tables) then |
| 11:       Run the pre-optimizer for SRAM caching |
| 12:       Run the pre-optimizer for HBM caching |
| 13:       Run the optimizer for HBM/DDR caching with the space constraints using the output partition values from the previous step as a starting point |
| 14:       else if model = large (more than 100 embedding tables) then |
| 15:       Run the pre-optimizer for SRAM |
| 16:       Run the pre-optimizer for HBM/DDR |
| 17:       Sort each partition in the descending order of their keys |

Along with space constraints, an extra constraint is used in the optimizer (same as in Hetero-Rec) to push the non-cached embeddings onto the next level of cache using the equation: $X_{ik} = (m_i \Sigma_{j=1}^{k-1} X_{ij})$, where $m_i$ is the total number of records in the $i^{th}$ table.

For small models, the optimizer is run after the pre-optimizer for SRAMs. This is because the pre-optimizer considers combinations with similar percentages of hit rates from each table. For example, it evaluates a combination with 75% hit rate on Table 1, Table 2, and Table 3, satisfying the condition of an overall hit rate of at least 5%. However, it does not evaluate a combination with, for instance, entries from Table 1 satisfying 40% queries, Table 2 with 60%, and Table 3 with 90% queries in the cache which is expected to give a decent overall hit rate. Therefore, the optimizer is run on top of the pre-optimizer to cover those combinations.

For medium-sized models (medium models), the optimizer is not run for SRAM caching due to a larger number of tables and a high number of large-sized tables. Partitioning with extreme ends of percentage queries being satisfied from different tables would result in exceeding the available SRAM space. Additionally, the SRAM utilization for storing RS parameters is high. Hence, the pre-optimizer is either sufficient for table partitions or allocates smaller tables on SRAM. However, due to the availability of larger HBM/DDR, it is worth using an optimizer on top of the pre-optimizer to achieve optimal table partitions.

For large-sized models (large models), the same reasoning applies to both SRAM and HBM/DDR memories due to the very large number of tables. In this case, using only the pre-optimizer is sufficient for determining the table partitions in both SRAM and HBM/DDR memories.

FIG. 2 is a functional block diagram of the system 102 for optimal deployment of embedding tables across heterogeneous memory architecture 106 for high-speed recommendations inference, in accordance with some embodiments of the present disclosure. In an embodiment, the system 102 includes a processor(s) 204, communication interface device(s), alternatively referred as input/output (I/O) interface(s) 206, and one or more data storage devices or a memory 202 operatively coupled to the processor(s) 204. The system 102 with one or more hardware processors is configured to execute functions of one or more functional blocks of the system 102.

Referring to the components of system 102, in an embodiment, the processor(s) 204, can be one or more hardware processors 204. In an embodiment, the one or more hardware processors 204 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 204 are configured to fetch and execute computer-readable instructions stored in the memory 202. In an embodiment, the system 102 can be implemented in a variety of computing systems including laptop computers, notebooks, hand-held devices such as mobile phones, workstations, mainframe computers, servers, and the like. Typically, the servers with a larger number of cores provide high speed operations for real time dynamically changing requirements for implementation of system 102.

The I/O interface(s) 206 can include a variety of software and hardware interfaces, for example, a web interface, a graphical user and the like and can facilitate multiple communications within a wide variety of networks N/W and protocol types, including wired networks, for example, LAN, cable, etc., and wireless networks, such as WLAN, cellular and the like. In an embodiment, the I/O interface(s) 206 can include one or more ports for connecting to a number of external devices or to another server or devices to communicate the inference provided by the recommendation engine 106 to external devices or servers.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, the memory 202 includes a plurality of modules 210 such as the optimizer and the heterogenous mapper. Further, the plurality of modules 210 include programs or coded instructions that supplement applications or functions performed by the system 102 for executing different steps involved in the process of optimal deployment of embeddings tables across heterogeneous memory architecture 106 for high-speed recommendations inference, being performed by the system 102. The plurality of modules 210, amongst other things, can include routines, programs, objects, components, and data structures, which performs particular tasks or implement particular abstract data types. The plurality of modules 210 may also be used as, signal processor(s), node machine(s), logic circuitries, and/or any other device or component that manipulates signals based on operational instructions. Further, the plurality of modules 210 can be used by hardware, by computer-readable instructions executed by the one or more hardware processors 204, or by a combination thereof. The plurality of modules 210 can further include various sub-modules (not shown) that are used by the system 102.

Further, the memory 202 may comprise information pertaining to input(s)/output(s) of each step performed by the processor(s) 204 of the system 100 and methods of the present disclosure. Furthermore, the memory 202 includes a database 208. The database (or repository) 208 may include a plurality of abstracted pieces of code for refinement and data that is processed, received, or generated as a result of the execution of the plurality of modules in the module(s) 210. The database can also store the input parameters used by the optimizer such as the memory configuration of the heterogeneous memory architecture 106, an access latency of each memory type of the heterogeneous memory architecture, (iii) a total number of embedding tables (tables) in the RM 104, (iv) a plurality of embeddings in each of the plurality of embedding tables, (v) a Cumulative Distributive Function (CDF) depicting probability distribution of queries satisfied by caching the plurality of records from the plurality of embedding tables (vi) an input access pattern obtained from the CDF, and (vii) a table access pattern of each table from the total number of tables.

Although the database 208 is shown internal to the system 102, it will be noted that, in alternate embodiments, the database 208 can also be implemented external to the system 102, and communicatively coupled to the system 102. The data contained within such external database may be periodically updated. For example, new data may be added into the database (not shown in FIG. 2) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 102 are now explained with reference to steps in flow diagrams in FIG. 3 through FIG. 5.

FIG. 3 is a flow diagram illustrating a method 300 for optimal deployment of embeddings tables across heterogeneous memory architecture for high-speed recommendations inference, using the system of FIG. 1, in accordance with some embodiments of the present disclosure.

In an embodiment, the system 102 comprises one or more data storage devices or the memory 202 operatively coupled to the processor(s) 204 and is configured to store instructions for execution of steps of the method 300 by the processor(s) or one or more hardware processors 204. The steps of the method 300 of the present disclosure will now be explained with reference to the components or blocks of the system 102 as depicted in FIG. 1, 2 and the steps of flow diagram as depicted in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The steps 302 through 310 of the method 300 explain the Algorithm 2 of the Hetro-Rec++, Referring now to step 302, the pre optimizer, executed by the one or more hardware processors 204, receives the plurality of input parameters. The input parameters comprising:

(i) The memory configuration of the heterogeneous memory architecture 106 as described in FIG. 1. The heterogenous memory architecture 106 comprises the first level memory and the second level memory of the FPGA architecture and the CPU memory type (CPU DDR as depicted in FIG. 1). For each memory type the memory configuration specifies capacity in terms of number of memory units, and a width and a size of each memory unit available in each memory type.

(ii) The access latency of each memory type of the heterogeneous memory architecture providing information on number of clock cycles to wait before receiving 1st set of bytes from the memory. This enables the processor to determine the fastest to slowest memory type present in the heterogenous architecture, wherein the latency information is sued to decide the mapping of partitions to the physical memory type.

(iii) The total number of tables in the Recommendation Model (RM) 104, which are used for determining the type of RM 104 based on size of tables.

(iv) A plurality of embedding tables with different record size (v) The CDF, which depicts probability distribution of queries satisfied by caching a plurality of records from the plurality of embedding tables.

(vi) The input access pattern obtained from the CDF.

(vii) The table access pattern of each table from the total number of tables depicting number of access required from each table per inference.

At step 304 of the method 300, the optimizer executed by the one or more hardware processors 204 identifies a RM type based on the total number of the plurality of embedding tables. The RM type is one of a small model, a medium model, and a large model.

At step 306 of the method 300, the one or more hardware processors 204 determine the optimal deployment of the plurality of embedding tables on the first level memory and the second level memory in accordance with the RM type using one or more of (i) a pre-optimizer for determining initial table partitions within the plurality of embedding tables, an optimizer to determine final table partitions within the plurality of embedding tables by optimizing the initial partitions, and Round Trips (RTs) to the second level memory.

If the identified RM type is the small model then determining the optimal deployment of the plurality of embedding tables comprises running the pre-optimizer on the plurality of embedding tables for caching on the first level memory. The pre-optimizer determines whether to partition the plurality of embedding tables by analyzing a set of pre-defined combination of table partitions satisfying a set of space constraints with a predetermined criteria defining that an overall hit rates of each embedding table should be at least 5% (predefined criteria is as computed in Table-T4).

The set of space constraints comprises (i) overall caching not to exceed the total memory available on the first level memory and the second level memory, (ii) ignore memory available on registers of the RM model, (iii) memory utilized by the learned index technique to be less than the total space available on a second type of the first level memory.

If the plurality of embedding tables are to be partitioned the pre-optimizer determines the initial table partitions for the first level memory in accordance with predefined initial permissible combinations of table partitions as mentioned in Table-T6.

Further, the optimizer is run on the initial table partitions with the set of space constraints to optimize the initial table partitions for the first level memory and obtain the final table partitions for the first level memory for caching associated embeddings on the first type of the first level memory. Further, the number of Round Trips (RT) also referred to as RTT to the second level memory are computed by the optimizer for remaining table partitions other than the initial table partitions from among the plurality of embedding tables. Thereafter, if the RT is greater than unity, the pre-optimizer is run to determine the initial table partitions for the remaining table partitions followed by the optimizer for generating the final table partitions for the remaining table partitions for caching on the second level memory. However, if the RT is less than or equal to unity, the optimizer identifies the remaining table partitions as final table partitions to be pushed onto the second level memory. The pushing of final table partitions on the second level memory is in accordance with a memory constraint that not more than one embedding table is allocated to an individual bank among a plurality of banks of the second level memory. The final table partitions for each of the plurality of embedding tables are indexed using learned index technique (RadixSpline as explained above).

The technique used by the optimizer is in accordance with an optimizer and the heterogenous mapper of the HeteroRec framework for optimal deployment of embedding tables. The optimizer and the heterogeneous mapper leverages the input access pattern to generate <partitions, memory bank> pairs for optimal deployment of the embedding tables. The optimizer uses the modified RT technique (algorithm 1), which attempts to place minimum partitions in single bank among a plurality of banks available in of the second level memory to maintain the maximum RT across the plurality of banks of second level memory to a minimum value to manage storing all table partitions across a plurality of banks of the second level memory, wherein the maximum number of partitions are determined by iteration number of partitions from 1 to the total number of the plurality of embedding tables in the RM model, and wherein placement of partition is done alternatively based on size of the plurality of embedding tables.

Once final partitions are determined, at step 308 of the method 300, the one or more hardware processors 204 sort the final table partitions generated by one of pre-optimizer and optimizer based on keys associated with the final table partitions to run the learned index technique to be processed by RM during inference. At step 310 of the method 300 by the one or more hardware processors 204 dynamically map each table partition in accordance with the final table partitions to one of the first level memory and the second level memory by a heterogenous mapper executed by the one or more hardware processors on receiving a shuffle signal triggered due to change in the input access pattern.

If the identified RM type is the medium model: The optimal deployment process comprises:

1. Running the pre-optimizer on the plurality of tables for caching on the first type of the first level memory, wherein the pre-optimizer determines the initial table partitions for the first level memory in accordance with the initial permissible combinations of table partitions
2. Running the pre-optimizer to determine the initial table partitions for the second level memory among the remaining table partitions for caching the remaining table partitions on the second level memory.
3. Running the optimizer, with the set of space constraints, to optimize the initial table partitions and obtaining final table partitions for caching on the second level memory.

Once final partitions are determined, the final table partitions generated by one of pre-optimizer and optimizer based on keys associated with the final table partitions are sorted to run the learned index technique to be processed by RM during inference. Further, each table partition is dynamically mapped in accordance with the final table partitions to one of the first level memory and the second level memory by a heterogenous mapper executed by the one or more hardware processors on receiving a shuffle signal triggered due to change in the input access pattern.

If the identified RM type is the large model: The optimal deployment process comprises:

1. Running the pre-optimizer on the plurality of tables to obtain the final table partitions for caching on the first type of the first level memory.

2. Running the pre-optimizer on the remaining table partitions to obtain the final table partitions for caching on the second level memory.

Once final partitions are determined, the final table partitions generated by one of pre-optimizer and optimizer based on keys associated with the final table partitions are sorted to run the learned index technique to be processed by RM during inference. Further, each table partition is dynamically mapped in accordance with the final table partitions to one of the first level memory and the second level memory by a heterogenous mapper executed by the one or more hardware processors on receiving a shuffle signal triggered due to change in the input access pattern.

EXPERIMENTS AND OBSERVATIONS

Experimental Setup: The experimental setup utilizes different memory configurations based on the memory subsystem available in the Alveo U280 FPGA card, which is connected to a host CPU with DDR memory. In this setup, BRAM is considered as level-1 SRAM cache, and HBM/DDR serves as level-2 cache. Non-cached entries are fetched from the CPU DDR. URAM is used for storing RS parameters. For the experiments, the Taobao dataset with 8 tables as small-sized model, the Criteo Terabyte dataset with 26 tables as a medium-sized model is used and an artificially synthesized dataset with 350 tables as a large model is obtained. Tables with a dimension of 64 are categorized as "large" with total entries above 10, tables with dimensions 32 and 16 are categorized as "medium" with entries between 10 and 10, and tables with dimensions 8 and 4 are categorized as "small" with entries between 10 and 1000, as discussed in Section 4. Each entry is treated as a 32-bit floating-point number. For one round trip of HBM, 63 clock cycles (from Table 1) with an FPGA frequency of 100 MHz are considered. The CPU requires 150 clock cycles, obtained by averaging the measured embedding lookup times over different batch sizes and embedding vector dimensions, divided by the FPGA baseline clock frequency.

Results: From Table-T7, it is observed that the system 102 is able to optimally allocate the embedding tables across heterogeneous memories. For smaller models (small models) with a fewer number of tables, BRAM caching is leveraged, and the remaining partitions are placed on HBM/DDR. Additionally, a replication factor of 4 and 2 is used for the Taobao datasets, due to the availability of extra HBM/DDR banks. In the case of the Criteo dataset, it is observed that BRAM caching is not leveraged, and the entire embedding tables are put onto the memories without partitioning. Due to the presence of a larger number of embedding tables and their larger sizes, when using a single FPGA, two round trips to the HBM/DDR banks are required. Although the optimizer tries to partition the embeddings and reduce the RTT, the CPU memory access time is higher. For the large, synthesized dataset, the smaller tables are completely packed onto smaller memories. However, with two FPGAs, it is observed that a 50% miss the FPGA memories. This is because even with two FPGAs (a total of 80 GB), they cannot accommodate all the embedding tables (114 GB). With three FPGAs, although all the embedding tables can fit across FPGA memories, the % miss on the FPGA is still not 0. This is because the OAL is a function of both the miss % and the round trip time (RTT) to FPGAs. To achieve a 100% hit on FPGAs, the entire 1st table (around 52 GB) needs to be placed, which significantly increases RTT. This is smartly compensated by caching the top 80% of the embeddings and placing the remaining on the CPU. This reduces the RTTs and provides better latency compared to placing the embeddings entirely.

Discussions: It is observed that the disclosed pre-optimizer-optimizer framework of the system 102 allocates embeddings based on the model size, available resources, and the input access pattern. It is noteworthy that in smaller models and in larger models deployed over more than 2 FPGAS, the dominant factor affecting latency is the inter-device communication rather than the embedding fetch latency. One approach to mitigate this issue is through optimal batching. For instance, in the Taobao dataset scenario with 2 FPGAs, the Equation 7 approximates the C2H_lat (the bottleneck component) as 4.2 µs+(2048x)/(6473 MB/s), where 4.2 us represents the IL, 73 MB/s denotes the throughput, and BS-1 is approximately equal to (2048x)/64. The term 2048/64 is used since the data is always transferred in multiples of 64 bytes, and 2048B represents the approximate concatenated embedding size. 'x' represents the total number of batches or products. From Table 7, for Taobao with two FPGAs, the latency for x=1 is 0.57 mus. Therefore, the optimal batch size is obtained by equating the C2H_lat equation with 0.57x µs, resulting in an optimal batch size (x) of 32. The entire system can be pipelined to achieve a high throughput low latency system.

Furthermore, in the system disclosed herein, it is assumed that access to the access pattern is available. However, in reality, one needs to predict the future workload. There are many existing works that suggest various techniques that can be used to predict the future access pattern.

TABLE -T 7

Hetero-Rec++ Latency Analysis

| Dataset | #FPGAs | BRAM % hit | #Tables on BRAM (no cache condition) | HBMRTT | % Miss on FPGAs | Latency(without comm) (in µs) | End-to-End Latency (in µs) |
|---|---|---|---|---|---|---|---|
| Taobao | 1 | 11.7% | — | 1 | 0% | 0.68 | 6.78 |
| | 2 | 28.5% | — | 1 | 0% | 0.57 | 12.77 |
| Criteo | 1 | — | 18 | 2 | 0% | 1.26 | 7.45 |
| | 2 | — | 18 | 1 | 0% | 0.63 | 13 |
| Synthesized | 1 | — | — | 0 | 0% | X | X |
| | 2 | — | 120 | 18 | 50% | 12.75 | 27.65 |
| | 3 | — | 176 | 10 | 20% | 9.43 | 31.93 |
| | 4 | — | 201 | 6 | 0% | 2.52 | 33.68 |

PRODUCTION DEPLOYMENT CONSIDERATIONS: Hetero-Rec++ optimally distributes the embedding tables across memory heterogeneous architecture to reduce recommendation's model inference latency. The system architecture is assumed to be composed of multiple FPGAs and a GPU connected to a single CPU server. The FPGA memories and CPU memory are used for storing embedding tables and GPU is being used for executing the MLP operations for high-speed inference.

The basic workflow of the environment 100, comprising the system 102 with the pre-optimizer, the optimizer, and the RM 104 with the RM engine and the heterogenous memory architecture is provided below:

| | |
|---|---|
| 1. | Start |
| 2. | Asynchronously transfer embedding indices from CPU to FPGA-1 to FPGA-N |
| 3. | Launch 'N' kernels for 'N' FPGAs |
| 4. | Transfer unfetched embeddings' index and partially concatenated vectors asynchronously from N FPGAs to CPU |
| 5. | Concatenate all the embedding vectors |
| 6. | Fetch the missed embeddings from CPU-DDR |
| 7. | Transfer the embedding vectors from CPU to GPU |
| 8. | Launch GPU kernel |
| 9. | Copy the predicted products from GPU to CPU |
| 10. | Stop |

The concatenation of three embedding vectors of dimension 4096 took an average latency of around 1.7 µs, tested on a C++ program with CPU frequency set to maximum using 'cpupower frequency-set-g performance' command. Despite the possibility of fetching concatenated embeddings in parallel from multiple devices connected to different cores of a high-end server, such as the Intel®™ Xenon®™ CPU E7-8880, the assumption was made that inter-device communication occurs sequentially for modeling purposes. Hetero-Rec++ leverage knowledge of embeddings' access patterns for optimal placement of frequently accessed embeddings in faster memories. In production, Hetero-Rec++ shall be used with future access pattern of the embedding tables to perceive low recommendation latency. This requires to predict the workload using techniques described in various literature like Jiechao Gao, Haoyu Wang, and Haiying Shen. 2020. Machine Learning Based Workload Prediction in Cloud Computing. In 2020 29th International Conference on Computer Communications and Networks (ICCCN). 1-9. https://doi.org/10.1109/ICCCN49398.2020.9209730 and the like, and hence embeddings' access pattern in real time to optimally update the contents of the cache. The frequency of the refreshing the cache memories, by the system 102, would depend upon the change in access pattern (shuffle signal triggered on change in input access pattern). This may be governed according to business needs. To avoid disruption in service a set of active and passive FPGAs could be used. The passive FPGA would update its cache memory during cache refresh cycle, while active FPGA is serving the recommendation model.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for high-speed recommendations, the method comprising:
receiving, by a pre-optimizer executed by one or more hardware processors, a plurality of input parameters comprising (i) a memory configuration of a heterogeneous memory architecture used by a Recommendation Model (RM) during inference, the heterogenous memory architecture comprising a first level memory and a second level memory of a Field Programmable Gate Array (FPGA) accelerator, and a CPU memory type, (ii) an access latency of each memory type of the heterogeneous memory architecture, (iii) a total number of a plurality of embedding tables in the RM, (iv) a plurality of embeddings in each of the plurality of embedding tables, (v) an input access pattern of the plurality of embedding tables, and (vi) a table access pattern of each table from the plurality of embedding tables depicting number of access required from each table per inference;
identifying a RM type, by the one or more hardware processors, based on the total number of the plurality of embedding tables, wherein the RM type is one of a small model, a medium model, and a large model; and
determining an optimal deployment of the plurality of embedding tables on the first level memory and the second level memory in accordance with the RM type using one or more of a pre-optimizer for determining initial table partitions within the plurality of embedding tables, an optimizer to determine final table partitions within the plurality of embedding tables by optimizing the initial partitions, and Round Trips (RTs) to the second level memory, wherein if the identified RM type is the small model then determining the optimal deployment of the plurality of embedding tables comprises:
running the pre-optimizer on the plurality of embedding tables for caching on the first level memory, wherein
(a) the pre-optimizer determines whether to partition the plurality of embedding tables by analyzing a set of pre-defined combination of table partitions satisfying a set of space constraints with a predetermined criteria defining that an overall hit rates of each embedding table should be at least 5%, and
(b) if the plurality of embedding tables are to be partitioned the pre-optimizer determines the initial table partitions for the first level memory in accordance with predefined initial permissible combinations of table partitions;
running the optimizer on the initial table partitions with a set of space constraints to optimize the initial table partitions for the first level memory and obtain the final table partitions for the first level memory for caching associated embeddings on a first type of the first level memory;
calculating number of Round Trips (RT) to the second level memory for remaining table partitions other than the initial table partitions from among the plurality of embedding tables;
running, if the RT is greater than unity, the pre-optimizer to determine the initial table partitions for the remaining table partitions followed by the optimizer for generating the final table partitions for the remaining table partitions for caching on the second level memory; and
pushing, if the RT is less than or equal to unity, the remaining table partitions as final table partitions onto the second level memory, in accordance with a memory constraint that not more than one embedding table is allocated to an individual bank among a plurality of banks of the second level memory, wherein the final table partitions for each of the plurality of embedding tables are indexed using learned index technique;
sorting, by the one or more hardware processors, the final table partitions generated by one of pre-optimizer and optimizer based on keys associated with the final table partitions to run the learned index technique to be processed by RM during inference; and
dynamically mapping each table partition in accordance with the final table partitions to one of the first level memory and the second level memory by a heterogenous mapper executed by the one or more hardware processors on receiving a shuffle signal triggered due to change in the input access pattern.

2. The method of claim 1, wherein determining the optimal deployment of the plurality of tables, if the identified RM type is the medium model, comprises:
running the pre-optimizer on the plurality of tables for caching on the first type of the first level memory, wherein the pre-optimizer determines the initial table partitions for the first level memory in accordance with the initial permissible combinations of table partitions;
running the pre-optimizer to determine the initial table partitions for the second level memory among the remaining table partitions for caching the remaining table partitions on the second level memory; and
running the optimizer, with the set of space constraints, to optimize the initial table partitions and obtain final table partitions for caching on the second level memory;
sorting the final table partitions generated by one of pre-optimizer and optimizer based on keys associated with the final table partitions to run the learned index technique to be processed by RM during inference; and
dynamically mapping each table partition in accordance with the final table partitions to one of the first level memory and the second level memory by a heterogenous mapper executed by the one or more hardware processors on receiving a shuffle signal triggered due to change in the input access pattern.

3. The method of claim 1, wherein determining the optimal deployment of the plurality of tables for the large model comprises:
running the pre-optimizer on the plurality of tables to obtain the final table partitions for caching on the first type of the first level memory; and
running the pre-optimizer on the remaining table partitions to obtain the final table partitions for caching on the second level memory;
sorting the final table partitions generated by one of pre-optimizer and optimizer based on keys associated with the final table partitions to run the learned index technique to be processed by RM during inference; and
dynamically mapping each table partition in accordance with the final table partitions to one of the first level memory and the second level memory by a heterogenous mapper executed by the one or more hardware processors on receiving a shuffle signal triggered due to change in the input access pattern.

4. The method of claim 1, wherein the set of space constraints comprises:
overall caching not to exceed the total memory available on the first level memory and the second level memory, ignore memory available on registers of the RM model;
memory utilized by the learned index technique to be less than the total space available on a second type of the first level memory.

5. The method of claim 1, wherein technique used by the optimizer is in accordance with an optimizer and the heterogenous mapper of a Hetero-Rec framework for optimal deployment of embedding tables by leveraging the input access pattern to generate <partitions, memory bank> pairs, wherein the optimizer implements a modified RT technique, wherein the modified RT technique attempts to place minimum partitions in single bank among a plurality of banks available in of the second level memory to maintain the maximum RT across the plurality of banks of second level memory to a minimum value to manage storing all table partitions across a plurality of banks of the second level memory, wherein the maximum number of partitions are determined by iteration number of partitions from 1 to the total number of the plurality of embedding tables in the RM model, and wherein placement of partition is done alternatively based on size of the plurality of embedding tables.

6. The method of claim 1, wherein the first level memory comprises a first type and a second type, wherein in one type is used for caching and other type is used by the learned index technique for indexed final partitions.

7. A system for high speed recommendations, the system comprising:
a memory storing instructions;
one or more Input/Output (I/O) interfaces; and
one or more hardware processors coupled to the memory via the one or more I/O interfaces, wherein the one or more hardware processors are configured by the instructions to:
receive by a pre-optimizer executed by one or more hardware processors, a plurality of input parameters comprising (i) a memory configuration of a heterogeneous memory architecture used by a Recommendation Model (RM) during inference, the heterogenous memory architecture comprising a first level memory and a second level memory of a Field Programmable Gate Array (FPGA) accelerator, and a CPU memory type, (ii) an access latency of each memory type of the heterogeneous memory architecture, (iii) a total number of a plurality of embedding tables in the RM, (iv) a plurality of embeddings in each of the plurality of embedding tables, (v) an input access pattern of the plurality of embedding tables, and (vi) a table access pattern of each table from the plurality of embedding tables depicting number of access required from each table per inference;
identify a RM type, by the one or more hardware processors, based on the total number of the plurality of embedding tables, wherein the RM type is one of a small model, a medium model, and a large model; and
determine an optimal deployment of the plurality of embedding tables on the first level memory and the second level memory in accordance with the RM type using one or more of a pre-optimizer for determining initial table partitions within the plurality of embedding tables, an optimizer to determine final table partitions within the plurality of embedding tables by optimizing the initial partitions, and Round Trips (RTs) to the second level memory, wherein if the identified RM type is the small model then determining the optimal deployment of the plurality of embedding tables comprises:
running the pre-optimizer on the plurality of embedding tables for caching on the first level memory, wherein
(a) the pre-optimizer determines whether to partition the plurality of embedding tables by analyzing a set of pre-defined combination of table partitions satisfying a set of space constraints with a predetermined criteria defining that an overall hit rates of each embedding table should be at least 5%, and
(b) if the plurality of embedding tables are to be partitioned the pre-optimizer determines the initial table partitions for the first level memory in accordance with predefined initial permissible combinations of table partitions;
running the optimizer on the initial table partitions with a set of space constraints to optimize the initial table partitions for the first level memory and obtain the final table partitions for the first level memory for caching associated embeddings on a first type of the first level memory;
calculating number of Round Trips (RT) to the second level memory for remaining table partitions other than the initial table partitions from among the plurality of embedding tables;
running, if the RT is greater than unity, the pre-optimizer to determine the initial table partitions for the remaining table partitions followed by the optimizer for generating the final table partitions for the remaining table partitions for caching on the second level memory; and
pushing, if the RT is less than or equal to unity, the remaining table partitions as final table partitions onto the second level memory, in accordance with a memory constraint that not more than one embedding table is allocated to an individual bank among a plurality of banks of the second level memory, wherein the final table partitions for each of the plurality of embedding tables are indexed using learned index technique;
sort the final table partitions generated by one of pre-optimizer and optimizer based on keys associated with the final table partitions to run the learned index technique to be processed by RM during inference; and
dynamically map each table partition in accordance with the final table partitions to one of the first level memory and the second level memory by a heterogenous mapper executed by the one or more hardware processors on receiving a shuffle signal triggered due to change in the input access pattern.

8. The system of claim 7, wherein determining the optimal deployment of the plurality of tables, if the identified RM type is the medium model, comprises:
running the pre-optimizer on the plurality of tables for caching on the first type of the first level memory, wherein the pre-optimizer determines the initial table partitions for the first level memory in accordance with the initial permissible combinations of table partitions;

running the pre-optimizer to determine the initial table partitions for the second level memory among the remaining table partitions for caching the remaining table partitions on the second level memory; and running the optimizer, with the set of space constraints, to optimize the initial table partitions and obtain final table partitions for caching on the second level memory;

sorting the final table partitions generated by one of pre-optimizer and optimizer based on keys associated with the final table partitions to run the learned index technique to be processed by RM during inference; and dynamically mapping each table partition in accordance with the final table partitions to one of the first level memory and the second level memory by a heterogenous mapper executed by the one or more hardware processors on receiving a shuffle signal triggered due to change in the input access pattern.

9. The system of claim 7, wherein determining the optimal deployment of the plurality of tables for the large model comprises:

running the pre-optimizer on the plurality of tables to obtain the final table partitions for caching on the first type of the first level memory; and running the pre-optimizer on the remaining table partitions to obtain the final table partitions for caching on the second level memory;

sorting the final table partitions generated by one of pre-optimizer and optimizer based on keys associated with the final table partitions to run the learned index technique to be processed by RM during inference; and dynamically mapping each table partition in accordance with the final table partitions to one of the first level memory and the second level memory by a heterogenous mapper executed by the one or more hardware processors on receiving a shuffle signal triggered due to change in the input access pattern.

10. The system of claim 7, wherein the set of space constraints comprises:

overall caching not to exceed the total memory available on the first level memory and the second level memory, ignore memory available on registers of the RM model;

memory utilized by the learned index technique to be less than the total space available on a second type of the first level memory.

11. The system of claim 7, wherein technique used by the optimizer is in accordance with an optimizer and the heterogeneous mapper of a Hetero-Rec framework for optimal deployment of embedding tables by leveraging the input access pattern to generate <partitions, memory bank> pairs, wherein the optimizer implements a modified RT technique, wherein the modified RT technique attempts to place minimum partitions in single bank among a plurality of banks available in of the second level memory to maintain the maximum RT across the plurality of banks of second level memory to a minimum value to manage storing all table partitions across a plurality of banks of the second level memory, wherein the maximum number of partitions are determined by iteration number of partitions from 1 to the total number of the plurality of embedding tables in the RM model, and wherein placement of partition is done alternatively based on size of the plurality of embedding tables.

12. The system of claim 7, wherein the first level memory comprises a first type and a second type, wherein in one type is used for caching and other type is used by the learned index technique for indexed final partitions.

13. One or more non-transitory machine-readable information storage mediums comprising one or more instructions which when executed by one or more hardware processors cause:

receiving by a pre-optimizer a plurality of input parameters comprising (i) a memory configuration of a heterogeneous memory architecture used by a Recommendation Model (RM) during inference, the heterogenous memory architecture comprising a first level memory and a second level memory of a Field Programmable Gate Array (FPGA) accelerator, and a CPU memory type, (ii) an access latency of each memory type of the heterogeneous memory architecture, (iii) a total number of a plurality of embedding tables in the RM, (iv) a plurality of embeddings in each of the plurality of embedding tables, (v) an input access pattern of the plurality of embedding tables, and (vi) a table access pattern of each table from the plurality of embedding tables depicting number of access required from each table per inference;

identifying a RM type based on the total number of the plurality of embedding tables, wherein the RM type is one of a small model, a medium model, and a large model; and determining an optimal deployment of the plurality of embedding tables on the first level memory and the second level memory in accordance with the RM type using one or more of a pre-optimizer for determining initial table partitions within the plurality of embedding tables, an optimizer to determine final table partitions within the plurality of embedding tables by optimizing the initial partitions, and Round Trips (RTs) to the second level memory, wherein if the identified RM type is the small model then determining the optimal deployment of the plurality of embedding tables comprises:

running the pre-optimizer on the plurality of embedding tables for caching on the first level memory, wherein (a) the pre-optimizer determines whether to partition the plurality of embedding tables by analyzing a set of pre-defined combination of table partitions satisfying a set of space constraints with a predetermined criteria defining that an overall hit rates of each embedding table should be at least 5%, and (b) if the plurality of embedding tables are to be partitioned the pre-optimizer determines the initial table partitions for the first level memory in accordance with predefined initial permissible combinations of table partitions;

running the optimizer on the initial table partitions with a set of space constraints to optimize the initial table partitions for the first level memory and obtain the final table partitions for the first level memory for caching associated embeddings on a first type of the first level memory;

calculating number of Round Trips (RT) to the second level memory for remaining table partitions other than the initial table partitions from among the plurality of embedding tables;

running, if the RT is greater than unity, the pre-optimizer to determine the initial table partitions for the remaining table partitions followed by the optimizer for generating the final table partitions for the remaining table partitions for caching on the second level memory; and pushing, if the RT is less than or equal to unity, the remaining table partitions as final table partitions onto the second level memory, in accordance with a memory constraint that not more than one embedding table is allocated to an individual bank among a plurality of banks of the second level memory, wherein the final table partitions for each of the plurality of embedding tables are indexed using learned index technique;

sorting the final table partitions generated by one of pre-optimizer and optimizer based on keys associated with the final table partitions to run the learned index technique to be processed by RM during inference; and dynamically mapping each table partition in accordance with the final table partitions to one of the first level memory and the second level memory by a heterogenous mapper on receiving a shuffle signal triggered due to change in the input access pattern.

14. The one or more non-transitory machine-readable information storage mediums of claim 13, wherein determining the optimal deployment of the plurality of tables, if the identified RM type is the medium model, comprises:

running the pre-optimizer on the plurality of tables for caching on the first type of the first level memory, wherein the pre-optimizer determines the initial table partitions for the first level memory in accordance with the initial permissible combinations of table partitions;

running the pre-optimizer to determine the initial table partitions for the second level memory among the remaining table partitions for caching the remaining table partitions on the second level memory; and running the optimizer, with the set of space constraints, to optimize the initial table partitions and obtain final table partitions for caching on the second level memory;

sorting the final table partitions generated by one of pre-optimizer and optimizer based on keys associated with the final table partitions to run the learned index technique to be processed by RM during inference; and dynamically mapping each table partition in accordance with the final table partitions to one of the first level memory and the second level memory by a heterogenous mapper executed by the one or more hardware processors on receiving a shuffle signal triggered due to change in the input access pattern.

15. The one or more non-transitory machine-readable information storage mediums of claim 13, wherein determining the optimal deployment of the plurality of tables for the large model comprises:

running the pre-optimizer on the plurality of tables to obtain the final table partitions for caching on the first type of the first level memory; and running the pre-optimizer on the remaining table partitions to obtain the final table partitions for caching on the second level memory;

sorting the final table partitions generated by one of pre-optimizer and optimizer based on keys associated with the final table partitions to run the learned index technique to be processed by RM during inference; and dynamically mapping each table partition in accordance with the final table partitions to one of the first level memory and the second level memory by a heterogenous mapper executed by the one or more hardware processors on receiving a shuffle signal triggered due to change in the input access pattern.

16. The method of claim 13, wherein the set of space constraints comprises:

overall caching not to exceed the total memory available on the first level memory and the second level memory, ignore memory available on registers of the RM model;

memory utilized by the learned index technique to be less than the total space available on a second type of the first level memory.

17. The one or more non-transitory machine-readable information storage mediums of claim 13, wherein technique used by the optimizer is in accordance with an optimizer and the heterogenous mapper of a Hetero-Rec framework for optimal deployment of embedding tables by leveraging the input access pattern to generate <partitions, memory bank> pairs, wherein the optimizer implements a modified RT technique, wherein the modified RT technique attempts to place minimum partitions in single bank among a plurality of banks available in of the second level memory to maintain the maximum RT across the plurality of banks of second level memory to a minimum value to manage storing all table partitions across a plurality of banks of the second level memory, wherein the maximum number of partitions are determined by iteration number of partitions from 1 to the total number of the plurality of embedding tables in the RM model, and wherein placement of partition is done alternatively based on size of the plurality of embedding tables.

18. The one or more non-transitory machine-readable information storage mediums of claim 13, wherein the first level memory comprises a first type and a second type, wherein in one type is used for caching and other type is used by the learned index technique for indexed final partitions.

* * * * *